United States Patent
Nogami

(10) Patent No.: US 12,112,462 B2
(45) Date of Patent: Oct. 8, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Atsushi Nogami, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 416 days.

(21) Appl. No.: 17/326,179

(22) Filed: May 20, 2021

(65) Prior Publication Data

US 2021/0271913 A1 Sep. 2, 2021

Related U.S. Application Data

(63) Continuation of application No. PCT/JP2019/044804, filed on Nov. 15, 2019.

(30) Foreign Application Priority Data

Nov. 30, 2018 (JP) .................. 2018-225992

(51) Int. Cl.
*G06K 9/00* (2022.01)
*G06F 18/20* (2023.01)
(Continued)

(52) U.S. Cl.
CPC .......... *G06T 7/0002* (2013.01); *G06F 18/214* (2023.01); *G06F 18/217* (2023.01); *G06F 18/22* (2023.01); *G06F 18/285* (2023.01); *G06F 18/40* (2023.01); *G06N 20/00* (2019.01); *G06V 10/764* (2022.01); *G06V 2201/07* (2022.01)

(58) Field of Classification Search
CPC ............... G01N 21/88; G06N 20/00; G06T 2207/20081; G06T 2207/20084; G06T 7/0002; G06T 2207/30132; G06V 2201/07

See application file for complete search history.

(56) References Cited

U.S. PATENT DOCUMENTS

2018/0300874 A1* 10/2018 Karube ................ G06T 7/0004
2020/0175352 A1* 6/2020 Cha ......................... G06N 3/04
(Continued)

FOREIGN PATENT DOCUMENTS

JP   H10-21393 A1     1/1998
JP   2002056122 A *   2/2002
(Continued)

*Primary Examiner* — Gregory A Morse
*Assistant Examiner* — Owais Iqbal Memon
(74) *Attorney, Agent, or Firm* — Canon U.S.A., Inc. IP Division

(57) ABSTRACT

A detection unit configured to detect a detection target from an image to be processed by detection processing capable of adjusting at least one setting, a correction cost estimation unit configured to estimate a correction cost needed for correction needed in a case where a result of detection by the detection unit is corrected, an adjustment cost estimation unit configured to estimate an adjustment cost needed in a case where the setting of the detection processing is adjusted to the detection target, and a display control unit configured to perform control to display the correction cost and the adjustment cost on a display unit in a comparable manner are included.

16 Claims, 13 Drawing Sheets

(51) Int. Cl.
  G06F 18/21    (2023.01)
  G06F 18/214   (2023.01)
  G06F 18/22    (2023.01)
  G06F 18/40    (2023.01)
  G06N 20/00    (2019.01)
  G06T 7/00     (2017.01)
  G06V 10/764   (2022.01)

(56) References Cited

U.S. PATENT DOCUMENTS

| | | | |
|---|---|---|---|
| 2020/0257506 A1* | 8/2020 | Yoshiyama | G06N 3/105 |
| 2020/0334055 A1* | 10/2020 | Cho | G06F 9/453 |
| 2020/0349695 A1* | 11/2020 | Horita | G01N 21/892 |
| 2021/0209422 A1* | 7/2021 | Horita | G06V 10/50 |

FOREIGN PATENT DOCUMENTS

| | | | | |
|---|---|---|---|---|
| JP | 2002-183338 A | | 6/2002 | |
| JP | 2012-141862 A | | 7/2012 | |
| JP | 2014153906 A | * | 8/2014 | |
| JP | 2015007341 A | * | 1/2015 | |
| WO | 2017/138220 A | | 8/2017 | |
| WO | 2018079778 A1 | | 5/2018 | |
| WO | WO-2018076122 A1 | * | 5/2018 | G06F 16/783 |

* cited by examiner

INFORMATION PROCESSING APPARATUS, INFORMATION PROCESSING METHOD, AND STORAGE MEDIUM

CROSS-REFERENCE TO RELATED APPLICATIONS

This application is a Continuation of International Patent Application No. PCT/JP2019/044804, filed Nov. 15, 2019, which claims the benefit of Japanese Patent Application No. 2018-225992, filed Nov. 30, 2018, both of which are hereby incorporated by reference herein in their entirety.

BACKGROUND OF THE INVENTION

Field of the Invention

The present invention relates to a technique for detecting a deformation from an image of a structure.

Background Art

Detection processing for detecting a target object from an image is expected to improve in detection accuracy if a detection model and parameters used in the detection processing are adjusted to the detection target image. Patent Literature 1 discusses a technique related to detection processing for detecting an anomaly to inspect production processes, where the detection model of the detection processing is adjusted in response to a change of a product lot or environment. This technique includes evaluating a detection result, updating the detection model based on the result of evaluation, and performing the detection processing again.

In some cases, a detection result is manually corrected for use if the accuracy of the detection result is insufficient. For example, among inspection methods of a concrete wall surface of an infrastructural structure, such as a bridge or a tunnel, is a method for inspecting a captured image of the wall surface of the structure and recording the positions of deformations such as a crack. In this image-based inspection, deformations such as a crack are automatically detected from the inspection target image, whereby man-hours for manually recording deformations can be reduced. In reality, however, partial erroneous detection and omission of detection are difficult to eliminate completely in detecting deformations by the detection processing. A detection result insufficient for desired detection accuracy can be obtained as an inspection result to be recorded. In such a case, a final inspection result is preferably generated by manually observing the obtained insufficient detection result and making corrections according to need.

CITATION LIST

Patent Literature

PTL 1: Japanese Patent Application Laid-Open No. H10-21393

However, manually correcting the detection result incurs correction costs such as a time for the correction work. On the other hand, if the detection result is insufficient, the detection processing can be adjusted to improve the accuracy of the detection result as described above. However, even in such a case, the retraining and the like of the detection model also incur a temporal cost and/or a monetary cost.

SUMMARY OF THE INVENTION

The present invention has been achieved in view of the foregoing issues, and is directed to providing a mechanism for obtaining an appropriate detection result while suppressing costs.

The present invention is an information processing apparatus including a detection unit configured to detect a detection target from an image to be processed by detection processing capable of adjusting at least one setting, a correction cost estimation unit configured to estimate a correction cost needed in a case where a result of detection by the detection unit is corrected based on the result of detection, an adjustment cost estimation unit configured to estimate an adjustment cost needed in a case where the setting of the detection processing is adjusted to the detection target, and a display control unit configured to perform control to display the correction cost and the adjustment cost on a display unit in a comparable manner.

Further features of the present invention will become apparent from the following description of exemplary embodiments with reference to the attached drawings.

DESCRIPTION OF THE EMBODIMENTS

Figure 1:
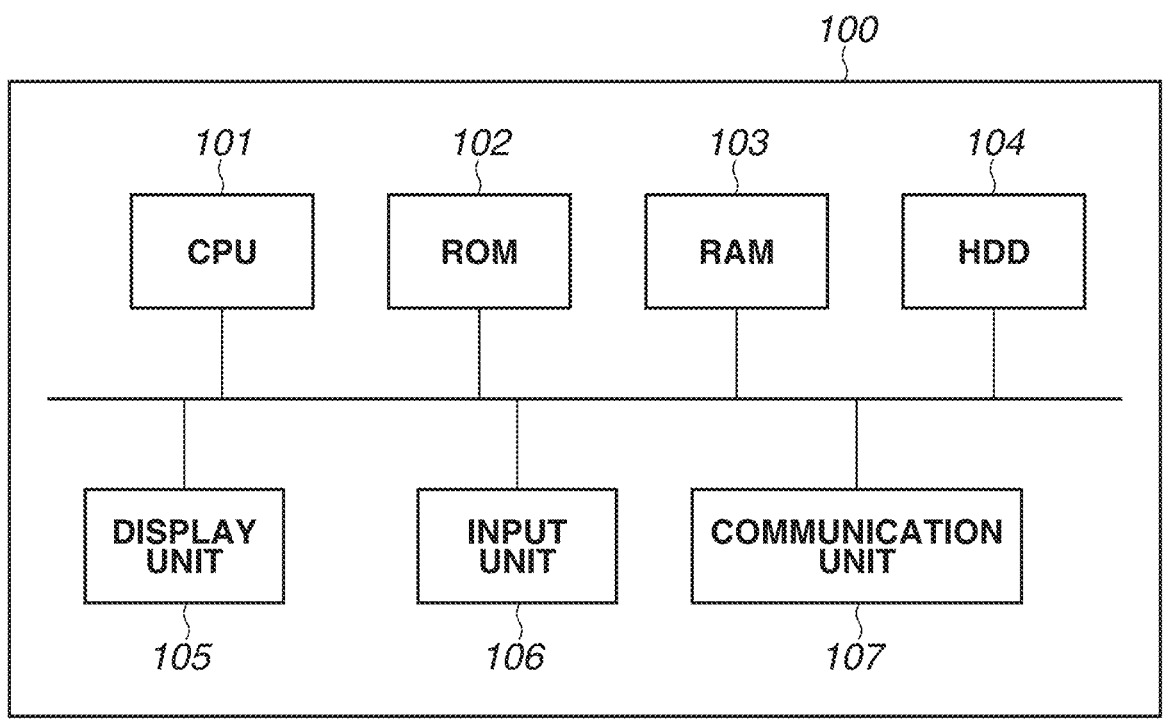
FIG. 1 is a hardware configuration diagram of an information processing apparatus according to a first exemplary embodiment.

Exemplary embodiments of the present invention will be described below with reference to the drawings.

First Exemplary Embodiment

A first exemplary embodiment deals with an information processing apparatus that performs detection processing for detecting a target object based on an image captured in inspecting a concrete wall surface of an infrastructural structure such as a bridge or a tunnel.

In inspecting wall surfaces of an infrastructural structure, the inspector records deformations of the concrete wall surfaces. Examples of the deformations of a concrete wall surface include cracks, efflorescence, rock pockets, cold joints, and exposed reinforcement. In the image-based inspection, the inspector captures images of the wall surfaces of the structure, and records the positions and ranges of deformations in the captured images to generate an inspection result. To find out and record all the deformations in the images is extremely hard work. The deformations are therefore desirably automatically detected from the images by machine-based detection processing. However, the detection results typically include omission of detection and detection errors, and the omission of detection and the detection errors need to be corrected to generate a correct inspection result. However, making manual corrections incurs work hours for correction. Such correction costs are desirably as low as possible.

The accuracy of the detection result is expected to improve if the detection processing is adjusted to the target structure. The images of the wall surfaces of the structure have wide variations depending on the type of wall surface, the imaging condition, etc. It is therefore difficult to obtain favorable detection results from all the images with given settings of the detection processing. By contrast, highly accurate detection results can be obtained by adjusting the settings of the detection processing to the target images of the detection. However, adjusting the detection processing also incurs adjustment costs such as time and fees. Specifically, if the detection processing is performed by using machine learning, retraining a detection model suitable for the detection target images incurs training time and the use fee of computer resources.

In view of this, the information processing apparatus according to the present exemplary embodiment calculates correction costs and adjustment costs based on a detection result and the like, and presents the correction costs and the adjustment costs to a user in a comparable manner. This enables the user to determine which is preferable, to employ the detection result, correct the detection result by user operations, and use the corrected detection result, or to adjust the detection processing, perform the detection processing again, and generate a new detection result. In the following description, the deformations to be detected from an image will be described to be cracks. However, the detection targets are not limited to cracks and may be any object identifiable from an image.

In the exemplary embodiment, an example of performing crack detection using Software as a Service (SaaS) will be described. With the SaaS according to the present exemplary embodiment, the user initially requests the service to detect cracks from a detection target image, and receives a detection result. The user checks the detection result, and determines whether to correct the detection result to generate a final inspection result or to adjust the detection processing and request the detection processing again. The SaaS according to the present exemplary embodiment is a service that charges use fees based on usage such as performing the detection processing and adjusting the detection processing. The information processing apparatus according to the present invention includes such a service function.

FIG. 1 is a hardware configuration diagram of an information processing apparatus 100 according to the first exemplary embodiment. The information processing apparatus 100 according to the present exemplary embodiment includes a central processing unit (CPU) 101, read only memory (ROM) 102, a random access memory (RAM) 103, a hard disk drive (HDD) 104, a display unit 105, an input unit 106, and a communication unit 107. The CPU 101 reads a control program stored in the ROM 102 and performs various types of processing. The RAM 103 is used as the main memory of the CPU 101 and a temporary storage area such as a work area. The HDD 104 stores various types of data, various programs, and the like. The display unit 105 displays various types of information. The input unit 106 includes a keyboard and a mouse, and accepts various operations made by the user. The communication unit 107 performs communication processing with an external apparatus, such as an image forming apparatus, via a network.

Functions and processing of the information processing apparatus 100 to be described below are implemented by the CPU 101 reading a program stored in the ROM 102 or the HDD 104 and executing the program. As another example, the CPU 101 may read a program stored in a recording medium such as a secure digital (SD) card, instead of the ROM 102 or the like.

As yet another example, at least some of the functions and processing of the information processing apparatus 100 may be implemented by cooperation of a plurality of CPUs, RAMs, ROMs, and storages, for example. As another example, at least some of the functions and processing of the information processing apparatus 100 may be implemented by using a hardware circuit.

Figure 2:
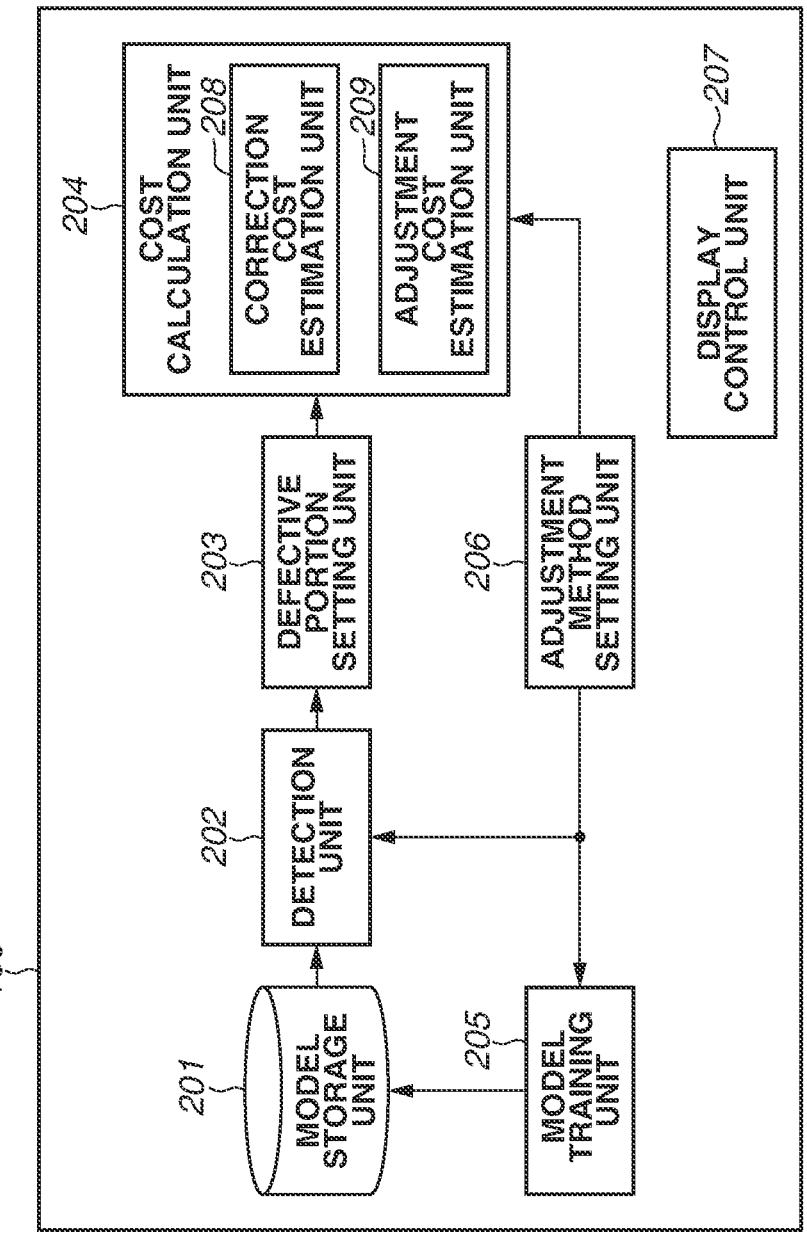
FIG. 2 is a functional configuration diagram of the information processing apparatus.

FIG. 2 is a functional configuration diagram of the information processing apparatus 100. The information processing apparatus 100 includes a model storage unit 201, a detection unit 202, a defective portion setting unit 203, a cost calculation unit 204 (correction cost estimation unit 208 and adjustment cost estimation unit 209), a model training unit 205, an adjustment method setting unit 206, and a display control unit 207. The model storage unit 201 stores a detection model for detecting cracks, trained with existing crack images. The detection unit 202 performs processing for detecting a detection target (cracks) based on the detection model. Note that the detection model, setting values, and the like of the detection processing performed by the detection unit 202 can be adjusted based on user operations. The defective portion setting unit 203 sets defective portions on a target image. As employed herein, a defective portion refers to a region where a correct determination result is not obtained.

The cost calculation unit 204 according to the present exemplary embodiment includes the correction cost estimation unit 208 that determines an estimated value of a correction cost, and the adjustment cost estimation unit 209 that determines an estimation value of an adjustment cost. As employed herein, the correction cost refers to a cost needed to correct the detection result based on user operations. The adjustment cost is a cost needed for adjustment when the settings of the detection processing by the detection unit 202 are adjusted to improve the detection result. Cost calculation processing will be described in detail below. The model training unit 205 trains the detection model. The adjustment method setting unit 206 sets an adjustment method of the detection processing based on user operations. The display control unit 207 controls display on the display unit 105.

Figure 3:
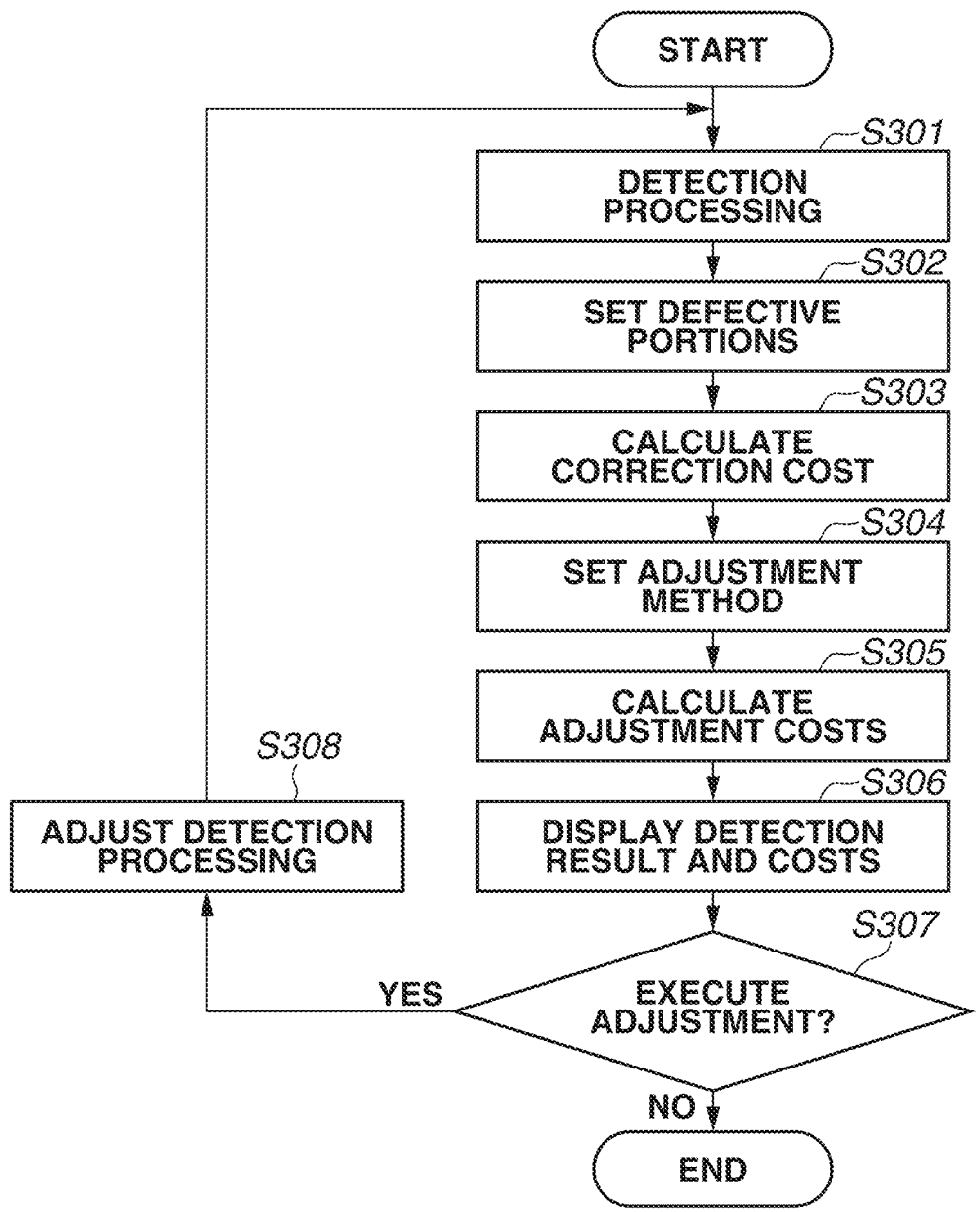
FIG. 3 is a flowchart illustrating cost display processing.

FIG. 3 is a flowchart illustrating cost display processing by the information processing apparatus 100. In step S301, the detection unit 202 of the information processing apparatus 100 obtains an image to be processed, and performs the detection processing on the obtained image. The image to be processed will hereinafter be referred to as a detection target image. As described above, in the present exemplary embodiment, the detection unit 202 detects cracks by using machine learning. A method for detecting cracks by using machine learning includes performing training using images including cracks and teaching data indicating crack positions. There are various methods for such training, any of which may be used. For example, whether each pixel of an image is a crack can be determined by a method of generating feature amounts about the respective pixels of the image and classifying the feature amounts using a classifier. Any method may be used for the feature amounts and the classifier. For example, methods using a histograms of oriented gradients (HOG) feature amount, a support vector machine (SVM), a convolution neural network (CNN), and the like may be used.

In machine learning, the weights of classifiers, such as an SVM and a CNN, need to be trained in advance by using existing crack images and teaching data. In performing the detection processing, the weights of the classifier are called and used. The detection model is the result of the advance training performed for the sake of the detection processing using machine learning, like the weights of the classifier. The model storage unit 201 stores the detection model for detecting cracks, trained with existing crack images.

Figure 4:
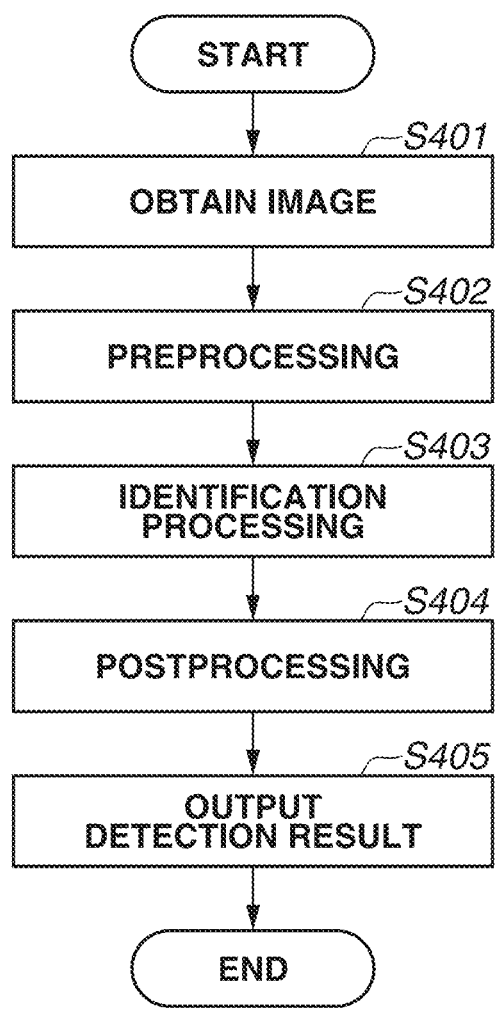
FIG. 4 is a flowchart illustrating detection processing.

FIG. 4 is a flowchart illustrating detailed processing of the detection processing (step S301). In step S401, to perform the detection processing, the detection unit 202 initially calls the detection model from the model storage unit 201. The detection unit 202 then obtains the detection target image. Next, in step S402, the detection unit 202 performs preprocessing on the detection target image. The preprocessing is processing for converting and processing the detection target image to facilitate the crack detection, such as removing image noise and adjusting luminance. Next, in step S403, the detection 202 performs identification processing on the detection target image by using the detection model. In the present exemplary embodiment, the detection unit 202, in the identification processing, identifies whether each pixel of the detection target image is a crack by using the classifier. The detection unit 202 further determines a score indicating the likelihood of being a crack for each pixel of the detection target image. The greater the value of the score indicating the likelihood of being a crack, the more likely the pixel is to be a crack. Data storing such a score in each pixel will hereinafter be referred to as a score map.

Next, in step S404, the detection unit 202 performs postprocessing. Specifically, the detection unit 202 performs threshold processing on the score map to determine pixels to be determined as cracks. The postprocessing may include processing for performing noise reduction processing on the score map or the result of the threshold processing, and processing for performing thinning processing on the score map to identify detailed crack positions. The postprocessing may further include processing for rectifying the positions and shapes of the crack detection results. Next, in step S405, the display control unit 207 performs control to display the detection result on the display unit 105.

As described above, the information processing apparatus 100 according to the present exemplary embodiment detects cracks in the detection target image in the detection processing by using the detection model trained with existing crack images. However, such a detection model is not necessarily suitable for the detection of the detection target image. In general, to obtain an accurate detection result, the image conditions of the training images are preferably similar to that of the detection target image. However, the image conditions of the training images can sometimes be different from that of the target detection image. For example, the images used to train the detection model include images of wall surfaces of various structures captured in the past. Since the structure wall surfaces are in various states of appearance, the appearance of the newly given detection target image is not necessarily similar to that of the training images. Moreover, since there are various states of image capturing conditions including an illumination condition, the training images and the detection target image can be dissimilar because of differences in the capturing conditions. In such cases, the detection target image results in a detection result with insufficient accuracy.

If the detection result is insufficient, the detection processing is preferably performed again with the detection model adjusted to a state suitable for the detection target image. An example of a method for adjusting the detection model is to retrain the detection model. A detection model suitable for the detection target image can be trained by inputting teaching data into part of the detection target image and training the detection model with the partial image. Alternatively, the detection model can be adjusted to the detection target image by preparing a plurality of detection models in advance and selecting one suitable for the detection target image. Specifically, a plurality of different detection models is trained with various combinations of training image sets and training parameters and stored in the model storage unit 201 in advance. If the detection processing is performed using one detection model and the detection result is insufficient, another detection model is selected and the detection processing is performed again.

As described with reference to FIG. 4, the detection processing includes the preprocessing (step S402), the identification processing (step S403), and the postprocessing (step S404), and there are various parameters in each of the processes. Examples include a parameter for adjusting the strength of noise reduction in the preprocessing and a threshold parameter of the score map threshold processing in the postprocessing. The detection processing is usually performed with such parameters set to general-purpose settings. However, a favorable detection result can be obtained by adjusting the parameters to the detection target image. For example, if crack detection results often result in erroneous detection, a favorable detection result can be obtained by adjusting the parameter to strengthen the noise reduction on the detection result.

As described above, there is a plurality of adjustment methods of the detection processing according to the present exemplary embodiment, including training of a detection model and parameter tuning. If the detection result is insufficient, the information processing apparatus 100 according to the present exemplary embodiment presents information for the user to determine whether to adjust the detection processing. Hereinafter, the determination about whether the detection result is insufficient will initially described, and then the presentation of the information will be described.

Figure 5:
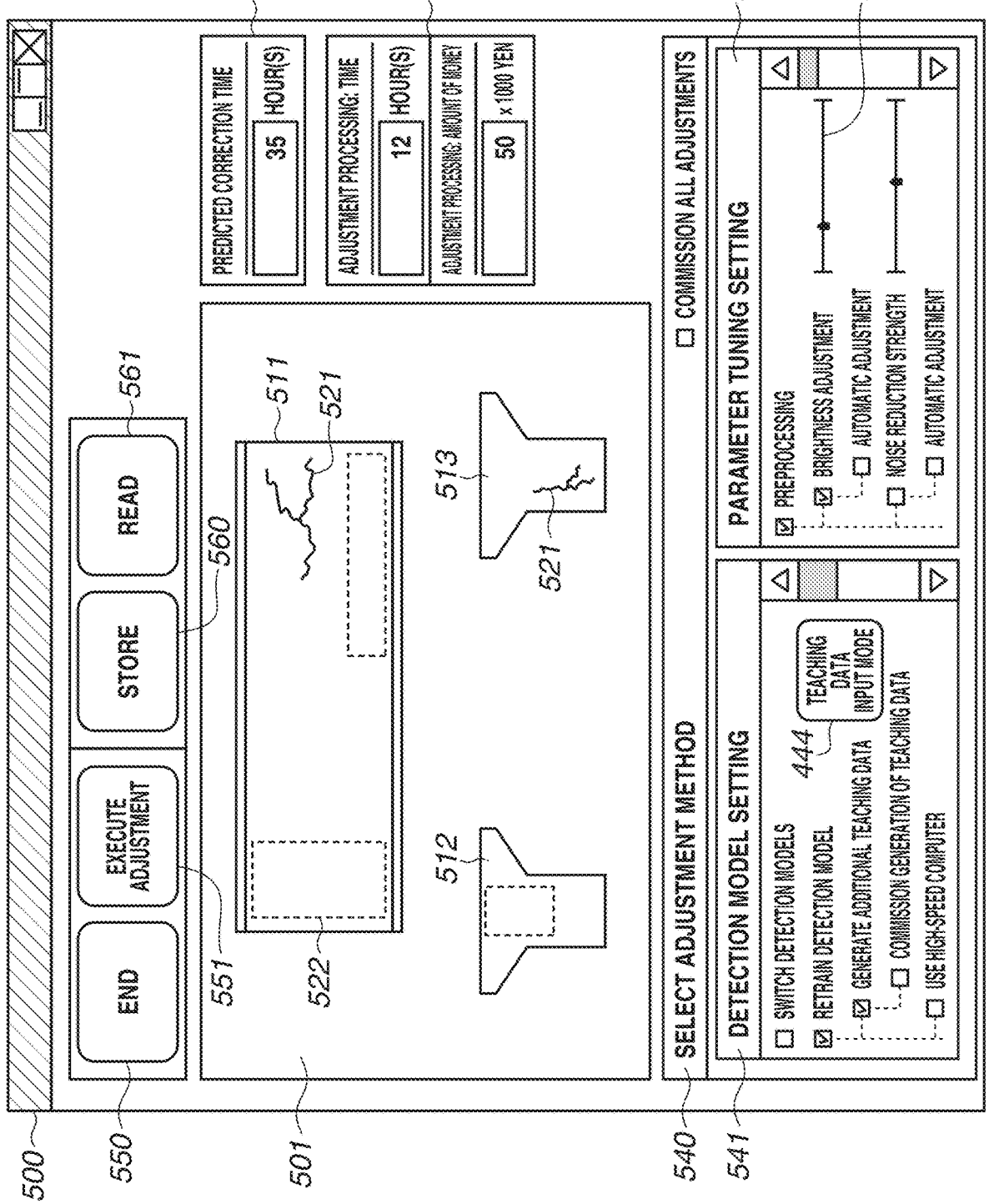
FIG. 5 is a diagram illustrating an example of an application screen for presenting a crack detection result.

Before a description of the processing subsequent to the detection processing, a window displayed on the display unit 105 will initially be described. FIG. 5 is a diagram illustrating a window 500 of a graphical user interface (GUI) application displayed on the display unit 105 after the detection processing. FIG. 5 illustrates a state where a detection target image and crack detection results are displayed in an image display area 501 of the window 500. The detection target image illustrated in FIG. 5 is image data on a plan view where wall surface images of wall surfaces of a bridge, or a floor stab 511 and bridge piers 512 and 513 of the bridge, are pasted. FIG. 5 illustrates a state where crack detection results 521 of the foregoing detection processing are displayed as detection result images superimposed on the detection target image. The image display area 501 of FIG. 5 further displays a region where the detection result is insufficient as a defective portion by a dotted-lined rectangle 522. The defective portions 522 are set by the defective portion setting unit 203.

Return to FIG. 3. In step S302 subsequent to step S301 described above, the defective portion setting unit 203 sets defective portions. A method for setting the defective portion 522 will now be described. In the present exemplary embodiment, the user specifies regions where the detection result is insufficient via the input unit 106. The user observes the detection result displayed in the image display area 501, and sets regions where there is an erroneous detection or a lack of detection as defective portions. For that purpose, the information processing apparatus 100 has a function of specifying a partial region of the image display area 501 using a rectangular shape or a free shape. To observe the detection result, the information processing apparatus 100 also has a function of displaying the detection target image on an enlarged/reduced scale and a function of switching about whether to display or hide the detection result. The defective portion setting unit 203 sets the defective portions based on user operations.

Figure 6:
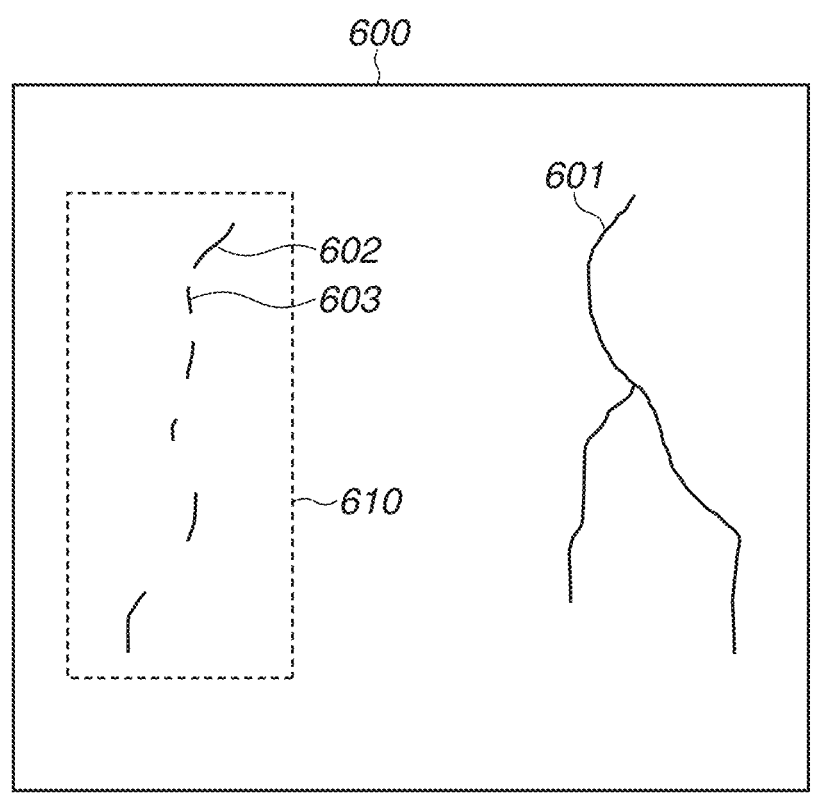
FIG. 6 is a diagram illustrating a display example of a window.

As another example, the defective portion setting unit 203 may set defective portions based on the result of the detection processing. Three types of methods for setting a defective portion in crack detection will now be described. Processing for evaluating the detection result and determining a defective portion will be described as a first method for setting a defective portion. As a specific determination method, a method for determining a region including a lot of short detection results as a defective portion will be described. FIG. 6 illustrates crack detection results of a detection target image 600. Since cracks typically have some lengths, a favorable detection result appears as a continuous line. For example, a crack detection result 601 in FIG. 6 is an example of a favorable detection result. By contract, if the result of the detection processing is insufficient, a crack detection result can be obtained as discontinuous results. For example, detection results 602 and 603 in FIG. 6 are discontinuous detection results of a crack that is supposed to be obtained as one continuous crack detection result.

Examples of the reasons why such discontinuous detection results are obtained are that the detection model is not suitable for the image of this crack portion and the calculated scores of the crack portion are not high. The pixel-by-pixel crack scores are subjected to the threshold processing in the postprocessing. If the detection model is not suitable, the pixels having low crack scores in the detection target fall to or below the threshold and fail to remain as a final detection result. As a result, the crack becomes discontinuous in the detection result. To improve this, measures such as training a detection model suitable for the image portion again and adjusting the threshold of the postprocessing in value need to be taken. The defective portion setting unit 203 identifies such a region of discontinuous detection results and sets a range including such a region as a defective portion 610. While the defective portion 610 of FIG. 6 is illustrated as a rectangular range, the setting shape of a defective portion is not limited thereto. A range of indefinite shape along the discontinuous detection results may be used.

Regions where detection errors occur due to stains, unevenness, and the like of the structure wall surfaces also tend to be regions including a lot of short detection results. The defective portion setting unit 203 then may calculate the number of short detection results in each local region of the detection result, and set a local region including a predetermined number of short detection results or more as a defective portion. Moreover, the defective portion setting unit 203 may connect a local region determined to include short detection results with nearby local regions to set a range having a certain size as a defective portion.

Next, a second method for setting a defective portion will be described. The second method sets a defective portion by using the score map that is intermediate information about the detection processing. As described above, the score map is a map storing the scores of the results of identification of the respective pixels of the detection target image by a crack detection model. A favorable score map is data where high scores are recorded only in crack portions. However, the classifier for crack detection is sensitive to edges in an image, and in fact relatively high scores are also recorded in edge portions other than cracks (such as a joint in a concrete wall surface). The detection target image typically includes non-crack edges such as a concrete joint. This makes the score map gradational, where relatively high scores are stored in image edge portions even in regions where there are no cracks. If the score of a non-crack edge portion exceeds the threshold of the postprocessing, an erroneous crack detection result occurs. In a truly favorable score map, the scores of non-crack edge portions fall within the threshold.

On the other hand, if a detection model not suitable for the detection target image is used for identification, zero or near-zero scores can be stored in all the pixels since no score is output at all. In some cases, a monotonous flat score map can be obtained since similar scores are output in any portion of the image. Regions where such a flat score map is obtained suggest that the detection model is not suitable for the detection target image. In view of this, the defective portion setting unit 203 may evaluate the flatness of the scores in each local region of the score map, and set a partial region outputting a score flatter than a predetermined standard as a defective portion obtained in the detection processing.

The flatness of a local region of the score map can be determined, for example, by calculating the distribution of scores in the local region and making a determination based on the state of the distribution. The defective portion setting unit 203 may connect a local region where the score map is determined to be flat with nearby local regions, and determine the resulting range having a certain size as a defective portion. By such a method, defective portions obtained in the detection processing can be set using the score map. The method for setting defective portions using the score map is not limited thereto, and other methods may be used.

Next, a third method for setting a defective portion will be described. The third method is a setting method for a case where the detection target image is an unknown image. As described above, crack detection using machine learning tends to result in insufficient detection processing for unlearned images. Specifically, for example, if the detection target image includes a structure wall surface texture not included in the training images, a favorable detection result is difficult to be obtained by the detection model trained with the training images. In view of this, in the third method, the defective portion setting unit 203 determines whether each local region of the detection target image is similar to a training image, and sets a dissimilar local region as a defective portion.

For that purse, an image similarity determiner for calculating the degree of similarity between a training data image set and the detection target image is generated and registered in the information processing apparatus 100 in advance. Any image similarity determiner that can calculate the degree of similarity between a training image set and a local region of the detection target image only needs to be used. For example, the image similarity determiner can be implemented in the following manner.

Initially, image feature amounts are extracted from each image in the training image set, and the distribution of the image feature amounts in a feature space is recorded. Next, an image feature amount is also extracted from the image of a local region of the detection target image, and the degree of similarity is calculated by determining the reciprocal of a distance from the feature amount distribution of the training image set. As the distance between the image feature amount and the feature amount distribution of the training image set, a distance between an average value of the distribution and the image feature amount may be determined. The distance may be determined by using a Mahalanobis distance. If the degree of similarity calculated thus is less than or equal to a predetermined value, the local region of the detection target image is an unlearned unknown image, and the detection result is not expected to have high performance. Local regions having a degree of similarity less than or equal to the predetermined value are thus set as defective portions.

While the three types of methods for automatically setting defective portions have been described above, the method for automatically setting defective portions is not limited thereto. The defective portion setting unit 203 can set portions where the result of the detection processing is insufficient or portions where the result of the detection processing is estimated to be insufficient as defective regions.

Moreover, the defective regions automatically set by the defective portion setting unit 203 using the foregoing method may be correctable based on user operations. In such a case, the automatically set defective portions can be displayed in the image display area 501 (for example, the dotted-lined rectangle 522 in FIG. 5), and the input unit 106 can be given a GUI function so that the position, size, shape, and the like of the defective portion can be changed. Moreover, the user may be enabled to select and delete unsuitable ones among the automatically selected defective portions. The user may be further enabled to set any area as a defective portion in addition to the automatically set defective portions. In such cases, the defective portion setting unit 203 changes the defective regions based on the user operations.

As another example, the defective portion setting unit 203 may calculate the degree of defectiveness of the detection result pixel by pixel or local region by local region, and set regions where the degree of defectiveness is higher than or equal to a predetermined threshold as defective portions. As employed herein, the degree of defectiveness refers to a value that increases as the detection result of the pixel or local region becomes more defective. For example, the flatness of the score map according to the foregoing second method may be used as the degree of defectiveness. The distance from the feature amount distribution of the training image set according to the third method may be used as the degree of defectiveness. Moreover, the user may set a threshold for a given degree of defectiveness, and the defective portion setting unit 203 may set regions reaching or exceeding the set threshold for the degree of defectiveness as defective portions. In such a case, the input unit 106 and the display unit 105 are configured so that the threshold for the given degree of defectiveness can be set by using a GUI slide or the like. The input unit 106 and the display unit 105 are also configured so that the regions set as defective portions based on the set threshold are displayed. This enables the user to make adjustments so that desired ranges are set as defective portions while adjusting the threshold for the degree of defectiveness.

Figure 7:
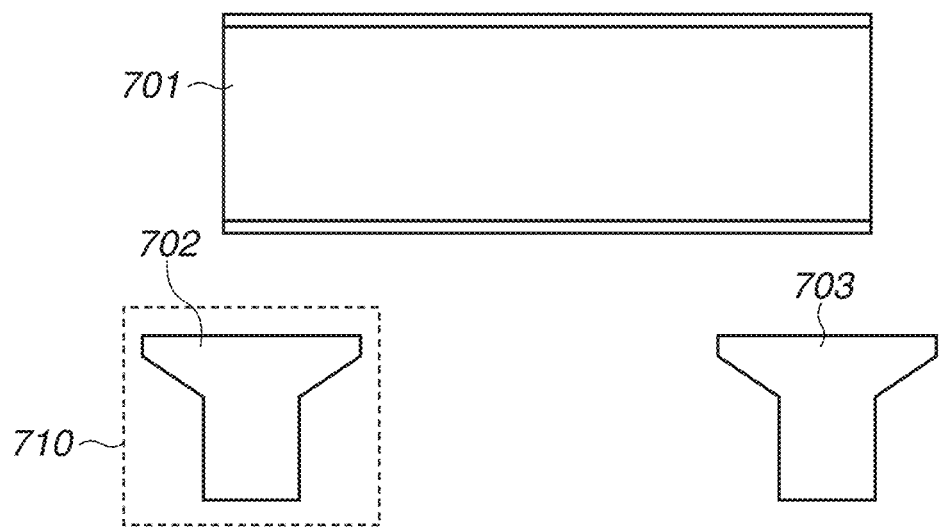
FIG. 7 is a diagram illustrating an example of a detection target image.

An exemplary embodiment for setting partial image regions of the detection target image as defective portions has been described above. As another example, the defective portion setting unit 203 may set defective portions in units of structural parts of the structure. For example, FIG. 7 illustrates a detection target image including three structural parts, or a floor stab 701 and bridge piers 702 and 703. Of these, the structural part that is the bridge pier 702 is determined as a defective portion 710. A method for determining defective portions thus in units of structural parts of the structure can be implemented in the following manner.

The defective portion setting unit 203 initially determines defective portions in units of partial image regions of the detection target image as described above. The defective portion setting unit 203 then calculates the amount of defective portions included in a structural part or the proportion of defective portions included in the region of a structural part with respect to each of predetermined structural parts. The defective portion setting unit 203 then sets a structural part or parts where the amount or proportion of such defective portions reaches or exceeds a predetermined level as a defective portion or portions.

Defective portion determinations can thereby be set in units of structural parts of the structure. In the example of FIG. 7, the structural parts to determine defective portions are the floor stab and the bridge piers. However, the division method of the detection target image is not limited thereto, and the detection target image may be divided by any division method. The defective portion setting unit 203 determines image regions where the accuracy of the detection processing is insufficient or image regions where the accuracy of the detection processing is estimated to be insufficient in the result of the detection processing by the foregoing method, and sets the image regions as defective portions.

Return to FIG. 3. After the processing of step S302, in step S303, the correction cost estimation unit 208 calculates a correction cost based on the defective portions set by the defective portion setting unit 203. This processing is an example of correction cost estimation processing for estimating a correction cost. The correction cost estimation unit 208 calculates a predicted correction time as the correction cost. As employed herein, the predicted correction time refers to a temporal representation of the correction cost, and represents a correction time needed when the user manually corrects the result of the detection processing. The correction cost estimation unit 208 calculates the predicted correction time based on the area of the image regions set as the defective portions. Since the defective portions are regions where the result of the detection processing is insufficient, the user needs to correct the detection result in such regions. If the correction time of such correction work per unit area is set in advance, the correction time can be predicted based on the area of the image regions of the defective portions. Specifically, the correction cost estimation unit 208 may calculate the correction time using (Eq. 1):

$$Cr=f(a)=wa+b. \qquad \text{(Eq. 1)}$$

Here, Cr is the correction cost (predicted correction time), a is the area of the defective portions, w is the correction time per unit area, and b is a fixed operation time (constant) occurring due to the execution of correction. The predicted correction time calculated as the correction cost is displayed in a correction cost display area 530 of FIG. 5.

In the foregoing example, the correction cost is calculated simply based on the area of the image regions of the defective portions. As another example, the correction cost estimation unit 208 may calculate the correction cost based on the image feature amounts of the defective portions. For example, the correction cost estimation unit 208 may estimate the correction difficulty levels of the defective portions based on the image feature amounts of the defective portions, and calculate the correction cost based on the correction difficulty levels. For example, if an image region of a defective portion is a concrete wall surface with a complicated texture, cracks are difficult to determine and the correction work needs time. If the texture is complicated, the correction difficulty level is thus determined to be high. If an image region of a defective portion is predicted to include a large amount of cracks, the number of times of determination and the number of times of input of cracks in the correction work increase. In such a case, the correction difficulty level is determined to be high.

A specific method for calculating a correction difficulty level based on such an idea will be described. For example, the correction cost estimation unit 208 calculates the correction difficulty level based on edge strength and the amount of edges in the image region of a defective portion. If the concrete wall surface has a complicated texture or the image region includes a large amount of cracks, there are a lot of strong image edges. In the present exemplary embodiment, the correction cost estimation unit 208 then performs edge extraction processing on the image region of the defective portion, and calculates the correction difficulty level based on the edge strength and the amount of edges in the defective portion. Specifically, the correction cost estimation unit 208 adds up the edge strengths of respective pixels in the defective portion and uses the result as the correction difficulty level. As another example, the correction cost estimation unit 208 may perform binarization processing for determining whether a pixel is an edge on each pixel of the defective portion, and use the number of pixels determined to be an edge in the region of the defective portion as the correction difficulty level.

In calculating the correction cost using the correction difficulty levels, the correction cost estimation unit 208 calculates the correction cost based on the values of the correction difficulty levels and the amount of defective portions where the correction difficulty levels are high. Specifically, for example, the correction time per unit area is set in advance so that the higher the correction difficulty level, the longer the correction time per unit area of the defective portion. The correction cost estimation unit 208 then predicts the correction time based on the areas of the image regions of the defective portions, the correction difficulty levels of the respective defective portions, and the correction times per unit area at the respective correction difficulty levels. Consequently, if many defective portions with high correction difficulty levels are included, a long correction time is predicted. The correction cost can thus be calculated based on the image feature amounts of the defective portions.

In the present exemplary embodiment, the correction cost estimation unit 208 calculates the time needed for the correction as the correction cost. However, the correction cost is not limited to time. As another example, the correction cost estimation unit 208 may calculate the amount of money needed for the correction as the correction cost. An example where the correction cost estimation unit 208 calculates the amount of money as the correction cost will now be described.

Initially, suppose that the crack detection according to the present exemplary embodiment is a form of SaaS service. Suppose also that the service provider provides a paid option where an operator manually corrects the detection result. The user can select to commission an operator to correct the defective portions of the detection result via the input unit 106.

If the user selects to commission an operator to correct the defective portions of the detection result, the correction cost estimation unit 208 switches the correction cost to the commission fee for the correction work and calculates the correction cost. Like the predicted correction time, the commission fee for the correction work is calculated based on the areas and the difficulty levels of the defective portions. In such a manner, the correction cost estimation unit 208 may calculate the amount of money as the correction cost. Alternatively, the correction cost estimation unit 208 may calculate both the time and the commission fee for the correction work as correction costs without the user selecting the option to commission the correction work.

The correction cost estimation unit 208 may calculate both the correction work time and the commission fee as the correction costs and display both the correction work time and the commission fee in the correction cost display area 530 without the user selecting the option to commission the correction work. This enables the user to compare the predicted time in the case where the user corrects the detection result by himself/herself with the amount of money in the case of commissioning the correction work, and determine whether to make corrections by himself/herself or commission the correction work.

After the processing of step S303 illustrated in FIG. 3, in step S304, the adjustment method setting unit 206 accepts an adjustment instruction based on user operations, and sets the adjustment method based on the adjustment instruction. The processing for accepting the adjustment instruction from user operations here is an example of adjustment instruction acceptance processing. Next, in step S305, the adjustment cost estimation unit 209 calculates adjustment costs corresponding to the adjustment method set in step S304. As employed herein, the adjustment costs refer to costs needed in a case where the detection processing is performed with the adjusted setting values. The processing of step S305 is an example of adjustment cost estimation processing for estimating an adjustment cost.

When a detection result is obtained, the user can not only correct the detection result but attempt to improve the detection result by adjusting the detection processing and performing detection again. For that purpose, the window 500 illustrated in FIG. 5 displays an adjustment area 540 for setting the adjustment method of the detection processing and an adjustment cost display area 531 for displaying the adjustment costs based on the set adjustment method. The processing for setting the adjustment method of the detection processing (step S304) and the processing for calculating the adjustment costs (step S305) will now be described.

The adjustment area 540 of the window 500 illustrated in FIG. 5 will initially be described. The adjustment area 540 includes an area 541 for setting adjustments related to the detection model of the detection processing, and an area 542 for setting various parameters. As described above, in the detection processing performed by the detection unit 202 of the present exemplary embodiment, settings such as the parameters of the detection model and the detection processing can be adjusted to perform detection suitable for the detection target image. The adjustment method has a plurality of setting items, and the adjustment area 540 accepts operations for setting a plurality of adjustment methods.

For example, the area 541 for setting the adjustment method related to the detection model includes an item for setting "switch detection models". With this setting, an adjustment method for switching to another detection model stored in the model storage unit 201 and performing detection processing again can be selected. Note that the model storage unit 201 stores a plurality of detection models trained under different conditions.

Moreover, if an item "retrain detection model" is selected, a setting to retrain the detection model can be made. With the setting "retrain detection model", "generate additional teaching data" can be further set to input teaching data into part of the detection target image. A detection model suitable to detect the detection target image can thus be trained by using the partial image of the detection target image and the corresponding teaching data.

Various settings may be configured to be capable of selecting options. For example, in "generate additional teaching data", the user can commission a service operator to input teaching data by selecting an option item "commission generation of teaching data". Moreover, an option item "use high-speed computer" may be included to enable the user to select training by a high-speed computer.

The above is an example of the settings about the detection model, and the display contents in the area 541 for making detection model settings may include other training conditions etc. Furthermore, while FIG. 5 illustrates an example where checkboxes are displayed on the respective items to enable the setting of the items, the method for setting the items is not limited thereto. As another example, the window 500 may include a different interface. For example, setting items for adjusting various detection methods may be sequentially displayed to have the user determine whether to apply the settings.

Similarly, the area 542 for setting parameters displays items for setting the parameters of the preprocessing, the postprocessing, and the like of the detection processing. As an example, FIG. 5 illustrates an interface for applying settings to adjust parameters "brightness adjustment" and "noise reduction strength" of the preprocessing. FIG. 5 illustrates an example where sliders 543 are displayed to set the values of such parameters. Note that the types of parameter settings are not limited thereto, and other parameters may be set. For example, the value of the threshold of the score map threshold processing in the postprocessing may be settable. A parameter for adjusting the noise reduction strength of detection result noise in the postprocessing may be settable.

FIG. 5 illustrates a state where the user has set the adjustment method such as turning on/off of items and adjusting parameter values in the adjustment area 540. In an initial state of the adjustment area 540 before the setting of the adjustment method by the user, the settings of all the adjustment items are blank. In FIG. 5, the checkboxes of the adjustment method selected by the user are checked to indicate that the settings are to be applied. In the initial state, all the checkboxes are unchecked. The window 500 of FIG. 5 includes a slider 543 as a method for setting the brightness adjustment parameter of the preprocessing. FIG. 5 illustrates a state where the slider 543 is operated to set a parameter. In the initial state, the numerical values of such parameters are set to predetermined values.

In the example of FIG. 5, the adjustment costs are calculated based on the adjustment method set as illustrated in FIG. 5, and the adjustment costs are displayed in the adjustment cost display area 531. In the initial state, no adjustment cost is displayed in the adjustment cost display area 531. As another example, a message that the adjustment costs are zero may be displayed in the initial state.

Details of the initial state of the adjustment area 540 are not limited to the foregoing and may be different. For example, the adjustment settings of the detection method set by the user before may be recorded as the user's preferences, and the settings may be used as the initial state. As another example, an adjustment method set in a past case similar to the detection target structure may be called and used as the initial state. For example, similar past cases are configured so that a past case and an adjustment method can be called based on the type and characteristic of the structure. If the type and characteristics of the detection target structure are input, an adjustment method set for a similar structure is called and used as the initial state. Specifically, the type and characteristics of a structure refer to information about structure types such as a bridge and a tunnel, the number of years elapsed since construction, the location of the structure, an average annual temperature, etc.

A similar past case may be selected based on image features. In such a case, the image feature amounts of the detection target image and the images of the past cases are extracted, a past case having the most similar image feature amount to the detection target image is selected, and the adjustment method set in the past case is called. As for the values of the parameters of the detection processing, the parameters used in performing the detection processing in step S302 may be displayed as the initial setting values. Specifically, for example, the initial value of the "brightness adjustment" slider 543 in FIG. 5 may be displayed as the parameter used in performing the detection processing.

As described above, the adjustment area 540 provides display and displays an interface for the user to set the adjustment method of the detection processing. If the user sets an adjustment method in the adjustment area 540, the adjustment method setting unit 206 accepts the adjustment instruction related to the setting. The adjustment method setting unit 206 then sets the adjustment method based on the adjustment instruction. The adjustment cost estimation unit 209 then calculates the costs needed for the detection processing on which the set adjustment method is reflected as the adjustment costs.

In the present exemplary embodiment, the adjustment cost estimation unit 209 calculates an adjustment processing time and an amount of money for adjustment as the adjustment costs. A method for calculating the adjustment costs will now be described. The adjustment cost estimation unit 209 sets processing times and amounts of money for respective adjustment methods in advance, and calculates the adjustment processing time and the amount of money by adding up the processing times and amounts of money set for the adjustment methods based on a combination of adjustment methods set by the user. The processing times and amounts of money for the respective adjustment methods are set in advance based on the time, labor cost, calculation cost, and the like needed for each adjustment method.

For example, the setting to train the detection model involves long hours of calculation processing to perform the training processing. Such a setting therefore needs a long processing time and incurs fees to use computers. The processing time and the amount of money for the adjustment method involving the training of a detection model are therefore set high, compared to other adjustment methods. For the sake of the training, teaching data indicating crack positions also needs to be generated for a part of the detection target image, and setting the option to commission an operator to generate the teaching data incurs a time and labor cost for generating the teaching data. The adjustment costs, or the processing time and the amount of money, for such an option are therefore set to large values.

By contrast, if the user deselects the option to commission the generation of teaching data and selects to generate the teaching data by himself/herself, the adjustment costs decrease. The adjustment area 540 of FIG. 5 includes a button 544 for entering a mode to generate teaching data. If the button 544 is clicked, a tool for generating teaching data indicating crack positions for a part of the detection target image is activated. This teaching data input tool may be a tool for directly inputting the crack positions into the image display area 501 of FIG. 5, or another application different from the GUI application illustrated in FIG. 5.

A minimum image size at which teaching data needs to be input may be set in advance, and a range where teaching data needs to be input may be displayed on the detection target image. Moreover, a time needed for the user to input teaching data into the teaching data input range may be predicted and displayed on the teaching data input tool. The predicted time for inputting teaching data can be calculated as with the correction time that is the correction cost. Specifically, a teaching data input time per unit area is set in advance, whereby the teaching data input time can be predicted based on the area of the teaching data input range.

In the adjustment area 540 illustrated in FIG. 5, a method for retraining the detection model without generating teaching data can also be selected by setting "retrain detection model" to on and "generate additional teaching data" to off. If such a setting is selected, the training of a detection model suitable for the detection target image is attempted by using only existing data. The HDD 104 stores a database containing combinations of a sufficient amount and variations of concrete wall surface images with teaching data indicating crack positions in the images as the existing data. The detection unit 202 collects exiting data similar to the detection target image from the database. A detection model suitable for the detection target image can be trained by retraining the detection model with the collected existing image data.

Any method may be used to collect existing data similar to the detection target image. For example, the collection is performed in the following manner. Initially, image feature amounts of existing images in the database are extracted and clustering is performed in a feature amount space. Similar images among the existing images are thereby clustered. In addition, a representative feature vector such as a cluster center is calculated for each cluster. The feature amount of the detection target image and distances to the respective representative feature vectors are calculated, and the cluster at the closest distance is identified. The existing images included in the cluster and the teaching data thereof are used as the existing data similar to the detection target image. If the number of pieces of data included in the closest cluster is small, the data of n closest clusters may be used as the existing data.

In such a manner, a detection model suitable for the detection target image can be trained without generating additional teaching data. This enables adjustment to the detection processing while reducing the adjustment costs for generating additional teaching data. However, high detection accuracy is typically more likely to be obtained by training the detection model with additionally generated teaching data. The user can select whether to set an adjustment method that ensures high detection accuracy with an increase in the adjustment costs or an adjustment method that reduces the adjustment costs.

Moreover, the training of the detection model can be performed in a short time by enabling the option "use high-speed computer". This can reduce the processing time that is an adjustment cost. On the other hand, since the fee of use of the computer is needed, the amount of money set for the option "use high-speed computer" is high and the amount of money that is an adjustment cost increases.

The calculation of the adjustment costs related to the setting of the adjustment method for the training of the detection model has been described above. As for the setting of other adjustment methods of the detection processing, the adjustment methods are also similarly associated with processing times and amounts of money as implementation costs. For example, if "switch detection models" is selected, the processing time of redetection processing with the newly selected detection model and the fee to use the computer for calculation are added as adjustment costs. If the detection models are switched for redetection, no training processing is needed. This reduces the processing time and the amount of money to be added and makes the adjustment costs relatively small in value compared to the case where the training processing is selected. While the adjustment costs related to the setting of the detection model have been described above, processing times and amounts of money are also set for respective settings for implementing adjustments to the parameters of the preprocessing and the postprocessing, and the adjustment costs are calculated based on the setting state of the adjustment methods.

While the method for calculating the adjustment costs has been described above based on the adjustment method set in the adjustment method setting area 540, the adjustment costs may be calculated by using other information. For example, the adjustment cost estimation unit 209 may calculate the adjustment costs by using information about the detection target image as well. As a specific example where information about the detection target image is used, the adjustment cost estimation unit 209 may calculate the adjustment costs by using information about the image size of the detection target image. The processing time of the detection processing varies depending on the image size of the detection target image. The adjustment costs based on the detection target image can thus be calculated by assigning weights to the processing time and the implementation fee of the detection processing based on the image size. The method for calculating the adjustment costs by using information about the detection target image is not limited to the method using the image size, and other information may be used.

The processing order of the processing of step S303 and the processing of step S304 described above is not limited to the exemplary embodiment. As another example, the processing of step S303 may be performed after the processing of steps S304 and S305.

After the processing of step S305, in step S306, the display control unit 207 performs control to display the detection result, the correction cost, and the adjustment costs. Specifically, the display control unit 207 displays the window 500 illustrated in FIG. 5. The correction cost display area 530 displays the predicted correction time as the correction cost. If the correction cost is calculated in terms of the amount of money as described above, the correction cost display area 530 displays the amount of money as the correction cost. If both the correction time and the amount of money are calculated as the correction costs, both are displayed as the correction costs. The adjustment cost display area 531 displays two types of information, or the processing time and the amount of money, as the adjustment costs.

This can provide information for determining whether the user makes manual corrections or adjusts the settings of the detection processing and performs the detection processing again. The user refers to such information, and if the detection result is insufficient, can make an appropriate determination by comparing the costs of the measures to manually correct the detection result and those of the measures to perform the detection processing again. In other words, the user can determine whether to employ the detection result and make manual corrections or to adjust the detection processing and perform the detection processing again, by making comparisons in terms of time and the amount of money.

The display of the correction cost and the adjustment costs is updated as appropriate based on the user's operations. For example, if the user modifies the settings of the adjustment method in the adjustment area 540, the adjustment cost estimation unit 209 calculates the adjustment costs based on the latest settings, and the display control unit 207 updates the adjustment costs in the adjustment cost display area 531. If the user modifies the range of a defective portion of the detection result, the correction cost estimation unit 208 calculates the correction cost based on the modified defective portion, and the display control unit 207 updates the correction cost in the correction cost display area 530. Since the correction cost and the adjustment costs thus vary depending on the adjustment method and the state of the defective portions, the user can compare the correction cost with the adjustment costs and examine the measures to be taken for the detection result while modifying the adjustment method and the defective portions.

The correction cost and the adjustment costs thus vary if the adjustment method and/or the defective portions are/is changed. To search for appropriate settings, the information processing apparatus 100 can record such states. As illustrated in FIG. 5, the window 500 includes a "store" button 560 and a "read" button 561. These buttons can be used to store and read the adjustment method and the defective portions set at a point in time and the set of adjustment and correction costs calculated from the same. The information processing apparatus 100 may also has a function of displaying a stored plurality of sets of adjustment and correction costs in a comparable manner. The sets of adjustment and correction costs are listed by this function. The user can thus compare the plurality of sets of adjustment and correction costs and select the settings of the adjustment method and the defective portions indicating appropriate adjustment and correction costs.

To perform detection again with the set adjustment method, the user clicks an "execute adjustment" button 551 in the window 500. If this processing is performed, then in step S307 subsequent to step S306, the detection unit 202 determines that an adjustment execution instruction is accepted (YES in step S307), and the processing proceeds to step S308. Here, the adjustment execution instruction is an example of a re-execution instruction for the detection processing. In step S308, the CPU 101 changes the settings of the detection processing based on the set adjustment method. For example, the model training unit 205 trains a detection model suitable for the detection target image based on the set adjustment method, and sets the trained detection model as the detection model for use in the detection processing. Moreover, the detection unit 202 sets the parameters of the detection processing, for example.

If such preparations are completed, the CPU 101 advances the processing to step S301. In such a case, in step S301, the detection processing is performed with the modified (set) parameters etc. The subsequent processing is similarly performed to calculate the correction cost and the adjustment costs, and the user is asked whether to further adjust the detection processing. If the user accepts the detection result and determines not to make an adjustment, the user clicks an "end" button 550 in the window 500 to end the series of processes. If need arises, the user continues the correction work on the detection result. If the adjustment of the detection result is repeated a plurality of times, the fees to be paid are added up based on the content of the adjustment. The total amount that needs to be paid may be displayed on the display unit.

As described above, the information processing apparatus 100 according to the present exemplary embodiment can calculate the adjustment costs and the correction cost and display these in a comparable manner. The user can thus check the displayed adjustment costs and correction cost, and select whether to adjust the detection processing or correct the detection result. The user can select a method for obtaining an appropriate detection result at lower costs. In other words, the information processing apparatus 100 can provide a mechanism for obtaining an appropriate detection result while suppressing costs.

A first modification of the first exemplary embodiment will be described. The information processing apparatus 100 may store items that make the adjustment costs higher than or equal to predetermined values, and highlight the items that, when set, make the adjustment costs higher than or equal to the predetermined values in the adjustment area 540 of the detection processing in FIG. 5 in advance. As another example, the information processing apparatus 100 may display the processing times and the amounts of money to be added when items are set, along with the items. This enables the user to select the adjustment method of the detection processing while checking which item increases the adjustment costs when set.

In a second modification, the information processing apparatus 100 may calculate a correct answer rate from a part of the detection result and estimate the area of all the defective portions. In such a case, the information processing apparatus 100 obtains ground truth data on cracks corresponding to a part of the detection target image, and compares the ground truth data with the detection result in the partial region corresponding to the ground truth data. The information processing apparatus 100 then determines portions where the detection result is not correct as defective portions.

This method is not capable of clearly setting the defective portions in the entire detection target image. The information processing apparatus 100 thus estimates the total amount of defective portions (image area of the defective portions) by assuming that there are a similar proportion of defective portions in the entire detection target image to in the partial region corresponding to the ground truth data, and applying the proportion to the detection target image. Specifically, the information processing apparatus 100 calculates the proportion of the defective portions to the partial region corresponding to the ground truth data. The information processing apparatus 100 then estimates the product of the entire area of the detection target image and the proportion of the defective portions as the area of the defective portions in the entire detection target image. In such a manner, the information processing apparatus 100 may estimate the area of the defective portions without clearly setting the defective portions.

In a third modification, the detection processing by the information processing apparatus 100 is not limited to processing using machine learning. As another example, the information processing apparatus 100 may perform crack detection processing by using image processing such as edge detection. In such a case, the information processing apparatus 100 adjusts parameters related to the edge extraction in adjusting the detection processing.

Second Exemplary Embodiment

Next, an information processing apparatus according to a second exemplary embodiment will be described with a focus on differences from the information processing apparatus according to the first exemplary embodiment. In the cost display processing described with reference to FIG. 3, the detection processing is performed with different settings and a detection result corresponding to the detection result with the different settings is obtained each time the adjustment execution instruction is accepted in step S307. If the settings of the detection processing are different, non-defective portions and defective portions in the detection result can vary depending on the settings. The information processing apparatus according to the second exemplary embodiment generates a combined detection result by partially combining a plurality of different detection results so that fewer defective portions are included than in a single detection result. The information processing apparatus can thereby generate a detection result of higher accuracy than a single detection result.

Figure 8:
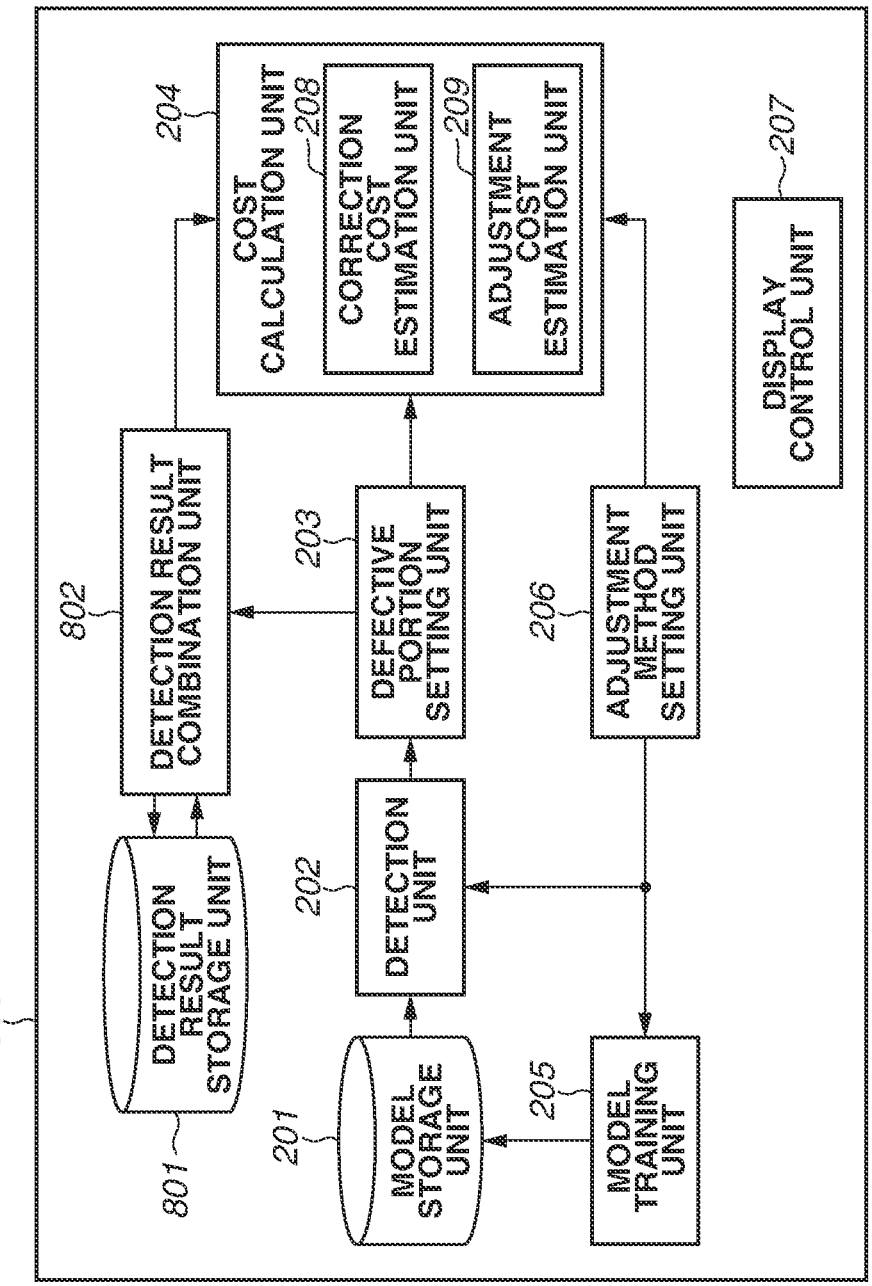
FIG. 8 is a functional configuration diagram of an information processing apparatus according to a second exemplary embodiment.

FIG. 8 is a functional configuration diagram of an information processing apparatus 800 according to the second exemplary embodiment. The information processing apparatus 800 includes a detection result storage unit 801 and a detection result combination unit 802 in addition to the functional configuration of the information processing apparatus 100. The detection result storage unit 801 stores detection results obtained by the detection unit 202 and defective portions set by the defective portion setting unit 203. The detection result combination unit 802 combines the detection results stored in the detection result storage unit 801.

Figure 9:
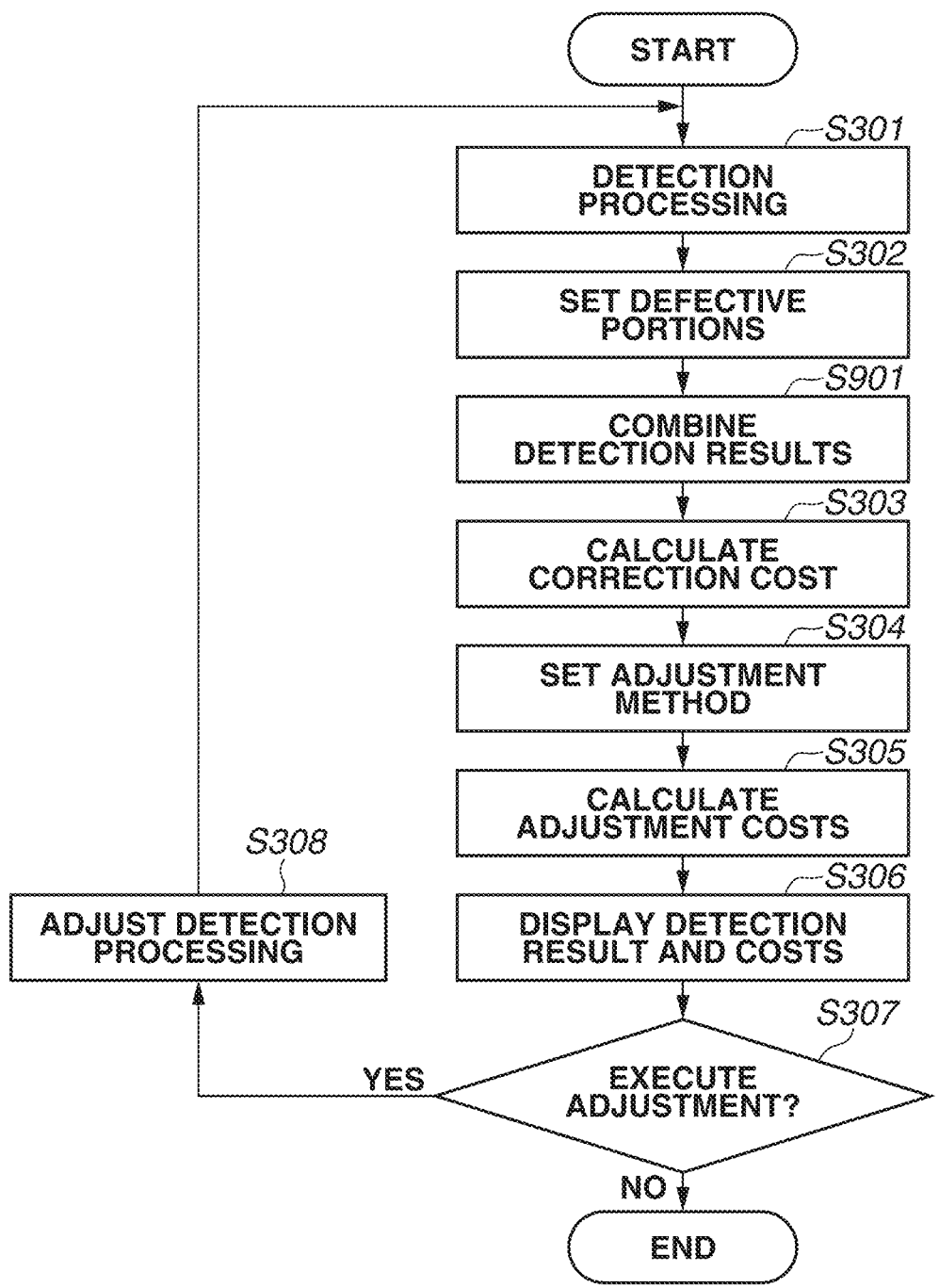
FIG. 9 is a flowchart illustrating cost display processing according to the second exemplary embodiment.

FIG. 9 is a flowchart illustrating the cost display processing according to the second exemplary embodiment. Of the processes of the cost display processing illustrated in FIG. 9, ones similar to those of the cost display processing according to the first exemplary embodiment described with reference to FIG. 3 are designated by the same numbers. In the cost display processing according to the second exemplary embodiment, after the processing of step S302, the CPU 101 advances the processing to step S901. In step S901, the detection result combination unit 802 combines detection results to obtain a combined detection result. The display control unit 207 then performs control to display the combined detection result. Note that if the detection processing in step S301 has been performed only once, i.e., if the processing of S901 is performed for the first time, there is only one detection result. In performing the processing of step S901 for the first time, the detection result combination unit 802 therefore stores the detection result obtained in step S301 and defective portions into the detection result storage unit 801. If the detection processing is repeated with different settings, a plurality of detection results obtained by a plurality of times of the detection processing is accumulated in the detection result storage unit 801. The CPU 101 then advances the processing to step S303.

Now, suppose that an adjustment execution instruction is accepted in step S307, and the detection processing in step S301 is performed again with settings different from those in the first detection processing. In such a case, in step S901 of the same loop processing, the detection result combination unit 802 reads the past detection result and defective portions stored in the detection result storage unit 801. The detection result stored in the detection result storage unit 801 here refers to that of the previous loop processing before the adjustment of the setting values of the detection processing. The detection result combination unit 802 further stores the detection result obtained by the detection processing in step S301 immediately before and the defective portions obtained by the defective portion setting processing in step S302 immediately before into the detection result storage unit 801 in preparation for the next and subsequent rounds of the detection result combination processing. The detection result combination unit 802 then generates a combined detection result by combining the past detection result(s) and defective portions with the detection result and defective portions obtained in the processing of steps S301 and S302 immediately before (processing performed in the present loop).

Figure 10:
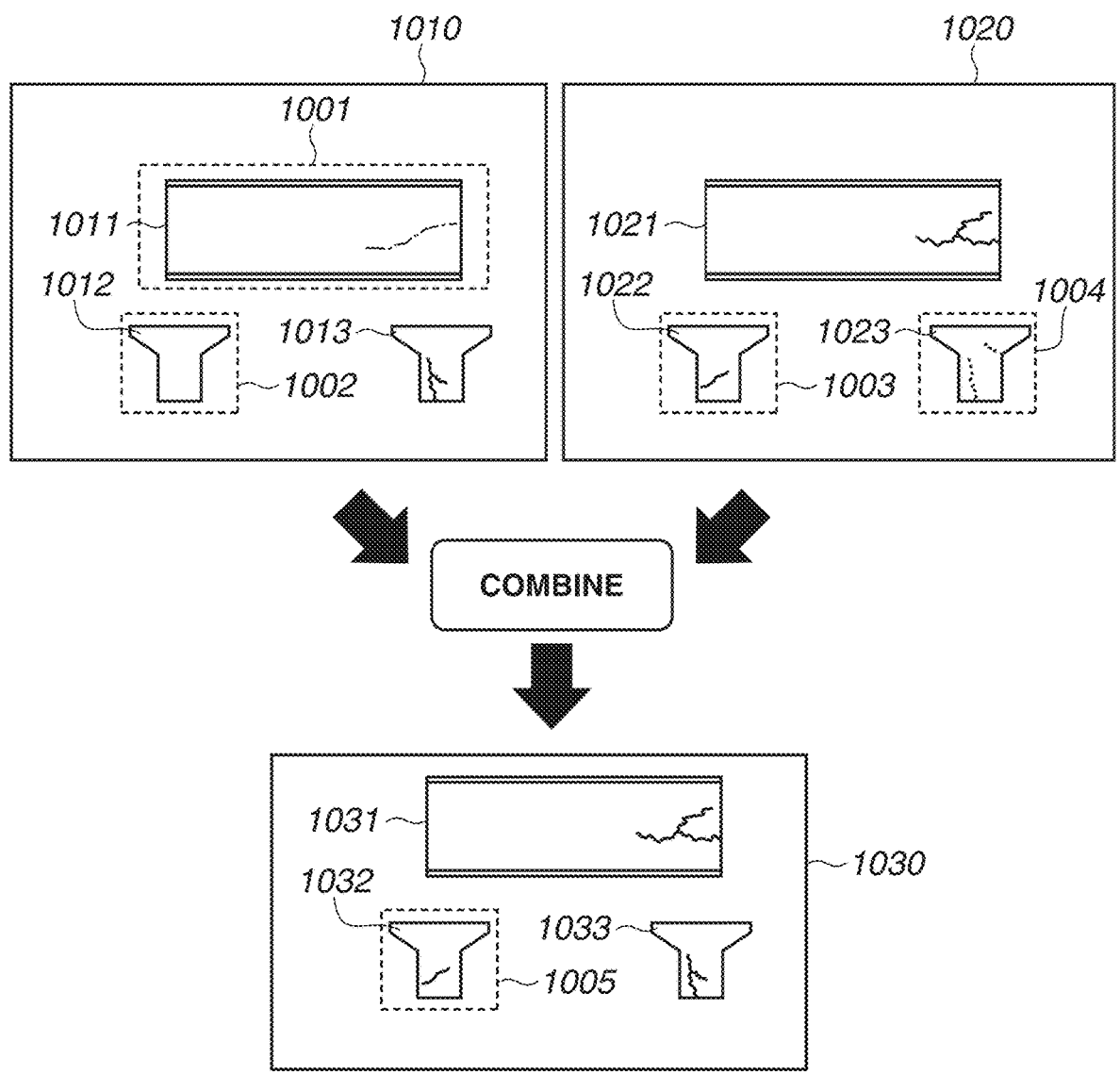
FIG. 10 is an explanatory diagram of detection result combination processing.

FIG. 10 is an explanatory diagram of the detection result combination processing (step S901). FIG. 10 illustrates detection target images, detection results of the crack detection, and defective portions in the detection results. FIG. 10 illustrates the detection target images including a plurality of structural parts of a bridge. Suppose here that a detection target image includes a floor stab and two bridge piers. Detection results 1010 and 1020 are detection results of the detection processing performed on the same detection target images with different settings. Here, the detection result 1010 is a past detection result read from the detection result storage unit 801. The detection result 1020 is the latest detection result obtained in the present loop. The detection result 1010 includes a floor stab 1011 and bridge piers 1012 and 1013. Similarly, the detection result 1020 includes a floor stab 1021 and bridge piers 1022 and 1023.

The two detection results 1010 and 1020 are the detection results corresponding to the detection processing with different settings, and thus include different detection results and defective portions. In FIG. 10, regions set as defective portions are indicated by dotted lines 1001, 1002, 1003, and 1004. In the example of FIG. 10, the defective portions are set in units of structural parts as described in FIG. 7.

In the processing of step S901, the detection result 1010 and the detection result 1020 are combined to generate a combined detection result 1030. In this processing, the detection result combination unit 802 employs a more favorable detection result in each partial area so that the combination makes defective portions fewer than in a single detection result. In the example of FIG. 10, the detection result combination unit 802 employs the floor stab 1021 in the detection result 1020 as a floor stab 1031 in the combined detection result 1030. The detection result combination unit 802 also employs the bridge pier 1013 in the detection result 1010 as a bridge pier 1033 in the combined detection result 1030. Here, both the floor stab 1021 and the bridge pier 1013 are portions estimated to be favorable detection results. The combined detection result 1030 generated by combining these portions therefore includes fewer defective portions than in the detection result 1010 or 1020.

In such a manner, a more favorable detection result can be generated by combining the detection results.

Note that a bridge pier 1032 in the combined detection result 1030 is the bridge pier 1022 in the detection result 1020, i.e., a defective portion. For a structural part of which no favorable detection result is obtained, a detection result determined as a defective portion needs to be employed. If there is a plurality of detection results of defective portions corresponding to a structural part of which no favorable detection result is obtained, the detection result combination unit 802 employs a detection result having a lowest degree of defectiveness among the plurality of detection results for the combined detection result. As employed herein, the degree of defectiveness is a value that increases as the detection result is more defective. For example, the proportion of defective portions included in the structural part is used as the degree of defectiveness. The determination criterion for employing one of the detection results of defective portions is not limited to the exemplary embodiment. As another example, the display control unit 207 may display a plurality of detection results, and the detection result combination unit 802 may employ a detection result selected by the user. As another example, the detection result combination unit 802 may employ a detection result randomly selected from the plurality of defective portions.

As described above, in step S901, the detection result combination unit 802 generates a combined detection result including fewer defective portions than in a single detection result by partially employing favorable detection results among a plurality of detection results. In step S901 in the second or subsequent loop, the detection result combination unit 802 generates a combined detection result as a detection result.

In the foregoing description, an example where two detection results, or the past detection result 1010 and the current detection result 1020, are combined has been described. However, the number of detection results to be combined is not limited to two. For example, if the detection result is repeated three times or more, three or more detection results are stored in the detection result storage unit 801. In such a case, the detection result combination unit 802 generates a combined detection result based on the three or more detection results.

A plurality of favorable results (results other than defective portions) can be obtained from the same parts of the detection target images. In such a case, a detection result to be employed for the combined detection result needs to be selected from the favorable portions. In such a case, the detection result combination unit 802 can employ one of the plurality of favorable detection results by using a method similar to the foregoing method for selecting a detection result to be employed for the combined detection result from a plurality of defective portions. Specifically, the detection result combination unit 802 can calculate the degrees of defectiveness of the favorable portions, and selects a detection result having a lowest degree of defectiveness as the detection result to be employed for the combined detection result. Instead of the degrees of defectiveness, the detection result combination unit 802 may calculate degrees of favorableness of the detection results, which indicate the degrees of the detection results being favorable, and select a detection result based on the degrees of favorableness. Alternatively, like the method of selection from a plurality of defective portions, the detection result combination unit 802 may select a detection result selected based on user operations, or select a detection result at random. The rest of the configuration and processing of the information processing apparatus 100 according to the second exemplary embodiment is similar to those of the information processing apparatus 100 according to the first exemplary embodiment.

A first modification of the second exemplary embodiment will be described. A combined detection result may always be stored in the detection result storage unit 801 except the first loop. In the detection result combination processing, the detection result combination unit 802 then may combine the past combined detection result stored in the detection result storage unit 801 with the latest detection result. In such a case, in the processing of step S901 in the second or subsequent loop, the detection result combination unit 802 combines the detection results and then overwrites the detection result storage unit 801 with the combined detection result. In step S901, the detection result combination unit 802 can thus generate a combined detection result into which a plurality of detection results in the past loops is combined, by always simply combining two detection results.

A second modification will be described. The information processing apparatus 100 according to the second exemplary embodiment is described to combine detection results in units of structural parts of the structure. However, the divided parts to combine the detection results of are not limited thereto. As another example, the information processing apparatus 100 may combine a plurality of detection results in units of continuous partial regions of the image. Specifically, a plurality of detection results including defective portions that are freely set regions in the image as illustrated in the image display area 501 of FIG. 5 is prepared. The detection result combination unit 802 then generates a combined detection result by combining such detection results in units of the partial regions so that the defective portions decrease. The detection results are difficult to combine if there is a continuous detection result, such as a crack, crossing the boundary of a defective portion. In such a case, the ranges of the defective portions are preferably set so that the crack detection results do not cross the boundaries of the defective portions.

A third modification will be described. In the exemplary embodiment, the information processing apparatus 100 is described to perform the detection processing once in step S301. Instead, the information processing apparatus 100 may perform detection processing with different settings at the same time. Then, in step S901, the information processing apparatus 100 combines the plurality of detection results obtained in step S301. Such a modification will now be described.

In the detection processing (step S301) in the first loop, the information processing apparatus 100 performs a plurality of detection processes with different settings. Here, the detection processes with different settings may be any detection processes. For example, the information processing apparatus 100 may call a plurality of detection models previously stored in the model storage unit 201, and use the different detection models for the respective detection processes. As another example, the information processing apparatus 100 may set different parameters for the preprocessing and/or the postprocessing of a detection process to implement a plurality of detection processes with different settings. Such settings may be a plurality of settings determined in advance, or may be ones set at random.

A plurality of detection results can be obtained from the detection target image by such detection processing results. In step S302, the defective portion setting unit 203 sets defective portions for each of the detection results. Then, in step S901, the detection result combination unit 802 generates a combined detection result by using the plurality of detection results obtained in step S301 and the information about the plurality of defective portions obtained in step S302.

Moreover, in the present modification, the information processing apparatus 100 may simultaneously set a plurality of different adjustment methods for adjusting the detection processing to improve the detection accuracy. For example, a plurality of different detection model training conditions may be set to train a plurality of new detection models. Like the detection processing in the first loop, a plurality of existing detection models may be selected, or a plurality of parameters may be set for the preprocessing and/or the postprocessing. With the adjustment methods of the detection processing set in such a manner, the detection processing is performed with a plurality of different settings and a plurality of different detection results is obtained even in the detection processing (step S301) in the second or subsequent loop. In the subsequent processing, the information processing apparatus 100 can similarly combine the plurality of detection results to generate a combined detection result.

Third Exemplary Embodiment

Next, an information processing apparatus 100 according to a third exemplary embodiment will be described with a focus on differences from the information processing apparatuses 100 according to the other exemplary embodiments. The information processing apparatus 100 according to the third exemplary embodiment estimates an effective adjustment method of the detection processing based on defective portions. The information processing apparatus 100 according to the third exemplary embodiment further predicts the effect of the adjustment, and presents the prediction result to the user as information for determining whether to adjust the detection processing. In the information processing apparatus 100 according to the third exemplary embodiment, the adjustment method setting unit 206 not only sets the adjustment method but identifies an effective adjustment method as a recommended adjustment method based on defective portions. This processing is an example of method identification processing. The adjustment method setting unit 206 further estimates the effects of improvement of the detection result, i.e., expected values of improvement when the detection processing is performed with various adjustment methods being set. This processing is an example of expected value estimation processing.

Processing for predicting an effective adjustment method based on defective portions will initially be described. In the present exemplary embodiment, the information processing apparatus 100 determines defective portions by applying a plurality of methods, and predicts an effective adjustment method based on which determination method the defective portions are determined by. A case where defective portions are determined by using the method for determining defective portions by evaluating the detection result and the method for determining defective portions using the score map, described in the first exemplary embodiment, will be described below as an example. In the following description, the method for determining defective portions by evaluating the detection result and the method for determining defective portions using the score map will be referred to as a first method and a second method, respectively.

Now, suppose that a partial region is determined to be a defective portion by the first method. As described above, one of the causes for a partial region to be determined to be a defective portion by the first method is that the threshold of the postprocessing is not appropriate. If the partial region is determined to be a defective portion by the first method, the adjustment method setting unit 206 therefore predicts a parameter adjustment, or postprocessing threshold adjustment in particular, as the effective adjustment method. Suppose now that a partial region is determined to be a defective portion by the second method. The second method is a method for determining defective portions based on the state of the score map, and that the score map is unfavorable means that the detection model used in the detection processing is not suitable for the detection target image. If the partial region is determined to be a defective portion by the second method, the adjustment method setting unit 206 therefore predicts a change or retraining of the detection model as an effective adjustment method.

Moreover, the display control unit 207 displays the effective adjustment methods, i.e., the adjustment methods expected to be effective in units of defective portions. For example, if the defective portion 522 is selected in the window 500 illustrated in FIG. 5, the display control unit 207 displays the adjustment method predicted to be favorable in improving the detection result of the defective portion 522.

The adjustment method setting unit 206 further integrates the adjustment methods favorable for the respective defective portions obtained thus to predict an adjustment method favorable for the entire detection target image. For example, the adjustment method setting unit 206 counts the effective adjustment methods predicted for the respective defective portions, and identifies the most frequently occurred adjustment method as the recommended adjustment method for the entire detection target image. The display control unit 207 then displays the setting values of items related to the predicted recommended adjustment method as initial setting values in the adjustment area 540.

The adjustment cost estimation unit 209 further predicts the correction cost of the detection result in the case where the detection processing is adjusted and redetection processing is performed based on the setting state of the adjustment method. Specifically, the defective portion setting unit 203 initially determines defective portions where the detection result is predicted to be improved by the adjustment. The correction cost estimation unit 208 then calculates a correction cost by excluding the improvement-predicted defective portions from the defective portions used to calculate a correction cost. The display control unit 207 then displays this correction cost as a "predicted correction cost by adjustment" so that a comparison can be made with the normal correction cost. This display enables the user to make a comparison about the prediction of the effect indicating how much the detection result is improved by the adjustment of the detection processing in terms of correction time and/or the amount of money.

Figure 11:
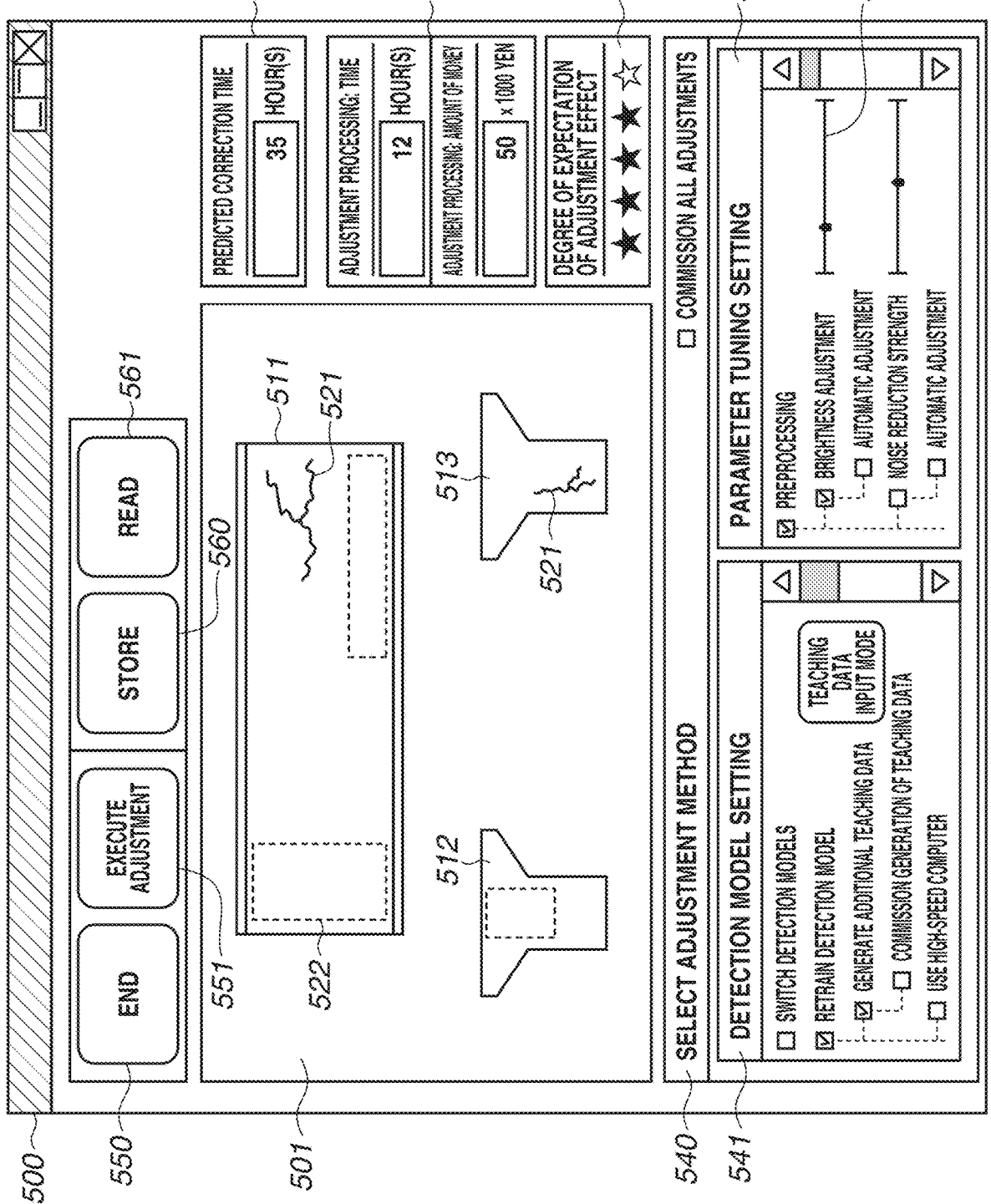
FIG. 11 is a diagram illustrating a display example of a window according to a third exemplary embodiment.

The information processing apparatus 100 further predicts the effect to be obtained when the settings of the detection processing are adjusted and the detection processing is performed again based on the adjustment method selected by the user. The effect of improvement of the detection result by the adjustment of the detection processing will hereinafter be referred to as an adjustment effect. FIG. 11 is a diagram illustrating a display example of the window 500 according to the third exemplary embodiment. The window 500 illustrated in FIG. 11 includes an adjustment effect display area 1101. The adjustment effect display area 1101 displays a five-level indicator indicating the degree of expectation of the adjustment effect predicted based on the setting state of the setting area 540.

The adjustment method setting unit 206 calculates an evaluation value of the adjustment effect based on the setting state of the adjustment area 540 and based on the number and area of defective portions where the detection result is expected to be improved. Specifically, the adjustment method setting unit 206 predicts effective adjustment methods as described above. The adjustment method setting unit 206 then compares the setting state of the adjustment area 540 with the effective adjustment methods for the respective defective portions, and calculates the number and area of defective portions where the detection result is expected to be improved. The adjustment method setting unit 206 then calculates, as the evaluation value of the adjustment effect, a value such that the adjustment effect increases as the number and area of the improvement-expected defective portions are greater.

The method for calculating the adjustment effect is not limited to the exemplary embodiment. For example, an adjustment method for inputting teaching data into the detection target image and training the detection model is expected to greatly improve performance if never have been applied before. If the adjustment method for inputting teaching data into the detection target image and training the detection model has not been applied in past adjustments and the adjustment method is set, the adjustment effect is therefore predicted to be high. In such a manner, for each of the adjustment method items, the effect of selection of the item may be set in advance, and the adjustment effect may be predicted based on that information. The rest of the configuration and processing of the information processing apparatus 100 according to the third exemplary embodiment are similar to those of the information processing apparatuses 100 according to the other exemplary embodiments.

As described above, in the information processing apparatus 100 according to the third exemplary embodiment, the adjustment method setting unit 206 not only sets an adjustment method but identifies an effective adjustment method as a recommended adjustment method based on defective portions. The adjustment method setting unit 206 further estimates the effects of improvement of the detection result, i.e., the expected values of improvement when the detection processing is performed with various adjustment methods being set. The user can check the degree of expectation in the case where the recommended adjustment method is used, and can thus select a more effective adjustment method.

A first modification of the third exemplary embodiment will be described. The method for displaying the adjustment effect is not limited to the exemplary embodiment. As another example, the display control unit 207 may numerically display the degree of expectation of the adjustment effect. As another example, the display control unit 207 may highlight the regions of the defective portions where the detection result is predicted to be improved by the adjustment. Examples of a method for highlighting the regions of the defective portions include filling the regions with semi-transparent color and blinking the lines surrounding the regions.

A second modification will be described. The method for predicting the recommended adjustment method is not limited to the exemplary embodiment. As another example, the information processing apparatus 100 prepares a large amount of set data on detection results including defective portions and adjustment methods for appropriately improving the detection results, trains a prediction model that can predict an appropriate method from a detection result, and stores the prediction model. The information processing apparatus 100 then may predict a recommended adjustment method based on the prediction model.

Fourth Exemplary Embodiment

The foregoing exemplary embodiments have been described by using a case where the detection target image includes images of a structure's wall surfaces and the detection targets are deformations such as a crack in a concrete wall surface as an example. However, the detection target image and the detection targets are not limited to the foregoing exemplary embodiments. In a fourth exemplary embodiment, a case where the detection target image and the detection targets are different from those of the foregoing exemplary embodiments will be described.

An information processing apparatus 100 is suitably applied to a case where the user wants to use the detection result even with some corrections. Examples include a case of generating teaching data for machine learning. As a more specific example, take human body detection by a monitoring camera. Suppose, initially, that a human body detection model (hereinafter, existing model) has been trained with ordinary images in advance. The monitoring camera is desired to detect a human body in an environment where the camera is installed. Since there are various installation environments, the existing model is not necessarily suitable for the installation environment of the camera. To improve the accuracy of the human body detection, the detection model of the human body detection is therefore desirably trained to the individual environment of the camera.

To achieve this purpose, images need to be in the individual camera installation environment, and training data for training the human body detection model needs to be generated from the images. Operations for generating the training data include initially preparing a large amount of images obtained by cropping frames of a moving image captured by the camera to train the detection model as a training image data set. Teaching data indicating a human body position is then input to each image in this training image data set. By such operations, training data including sets of an image and teaching data is generated.

Here, inputting teaching data indicating all human body positions into the large amount of images is extremely laborious work. Then, the information processing apparatus 100 initially performs human body detection processing on the images to input teaching data into by using the existing model. In portions where the detection results are correct, the detection results can be simply used as teaching data. This can significantly reduce the work for inputting teaching data. By contrast, portions including erroneous detection results, such as omission of detection and erroneous detection, are unable to be simply used as teaching data and thus need to be corrected. Then, the information processing apparatus 100 sets defective portions in the detection results, and displays a correction cost, such as a correction work time, based on the amount of defective portions etc. This enables estimation of how much correction work is needed to generate the teaching data.

If the detection processing is simply performed on the images in the training data set by using the existing model, the detection results can be insufficient since the detection processing is not adjusted to the images in the training data set. Since insufficient detection results make the correction work time enormous, there is a demand to generate teaching data based on more favorable detection results. Moreover, the accuracy of the detection results of the detection processing using the existing model can be improved by making adjustments to the detection processing, like using a different existing model or modifying various parameters. The detection processing is adjusted by the user setting various items of the detection processing to optimize the detection processing to the training image data set that is the detection target images. The information processing apparatus 100 can adjust such items of the detection processing. Using the detection results of which the accuracy is improved by the adjustment of the detection processing can reduce the correction work for generating the teaching data. While the user wants to adjust the detection processing to obtain more favorable detection results and use the detection results as the original data for generating the teaching data, performing the adjustment work on the detection processing entails adjustment costs such as a time for re-detection processing.

Even in the present exemplary embodiment, to calculate the correction cost, the information processing apparatus 100 needs to determine portions where the detection results of the existing model are insufficient as defective portions. In the first to third exemplary embodiments, partial regions of the detection target image are set as defective portions. By contrast, the information processing apparatus 100 according to the present exemplary embodiment determines defective portions in units of images. More specifically, in the present exemplary embodiment, the training image data set corresponds to the detection target image according to the other exemplary embodiments, and an image that is a part of the training image data set serves as a unit region to be determined as a defective portion. The defective portion setting unit 203 of the information processing apparatus 100 thus performs the detection processing on all the images in the training image data set, picks out images estimated to be insufficiently detected, and sets the images as defective portions in the training image data set.

The method for determining defective portions is not restrictive. For example, the defective portion setting unit 203 may determine unknown images that the existing model is unable to handle as defective portions. The images unknown to the existing model can be determined by applying the method using the image similarity determiner described in the first exemplary embodiment. For example, images with unknown illumination conditions or brightness are thereby determined to be defective portions. If an abnormal number of human bodies are detected in an image, there can be a large amount of occurred erroneous detection. The defective portion setting unit 203 may thus set such an image as a defective portion. In such a manner, the defective portion setting unit 203 may detect an anomaly in the detection result as a defective portion.

The correction cost estimation unit 208 calculates the correction cost based on the defective portions as described in the first exemplary embodiment. Since the defective portions are set in units of images, the information processing apparatus 100 according to the present exemplary embodiment can calculate the correction cost based on the number of images set as the defective portions. Specifically, the information processing apparatus 100 sets a correction time per image in advance. The correction cost estimation unit 208 then calculates the correction time based on the number of images set as the defective portions and the unit correction time per image.

The correction cost estimation unit 208 may also calculate the correction cost based on the image contents as described in the first exemplary embodiment. For example, the adjustment cost estimation unit 208 includes a detector for detecting a crowd of human bodies in an image, and determines images including a crowd of human bodies. Inputting exact human body positions into images of a crowd of human bodies is extremely time-consuming work. The correction cost estimation unit 208 may thus calculate the correction cost based on the number of human body crowd images in the training image data set. Even in such case, a unit correction time per human body crowd image is set in advance, and the correction cost estimation unit 208 calculates the correction cost based on the number of human body crowd images and the unit correction time per human body crowd image.

Moreover, the adjustment cost estimation unit 209 calculates the adjustment costs as described in the first exemplary embodiment. Specifically, the adjustment cost estimation unit 209 calculates the time and the amount of money needed for adjustment as the adjustment costs based on the adjustment items related to the training of the human body detection model and the adjustment settings of the parameters related to the preprocessing and the postprocessing of the detection processing. The rest of the configuration and processing of the information processing apparatus 100 according to the fourth exemplary embodiment are similar to those of the information processing apparatuses 100 according to the other exemplary embodiments.

Figure 13:
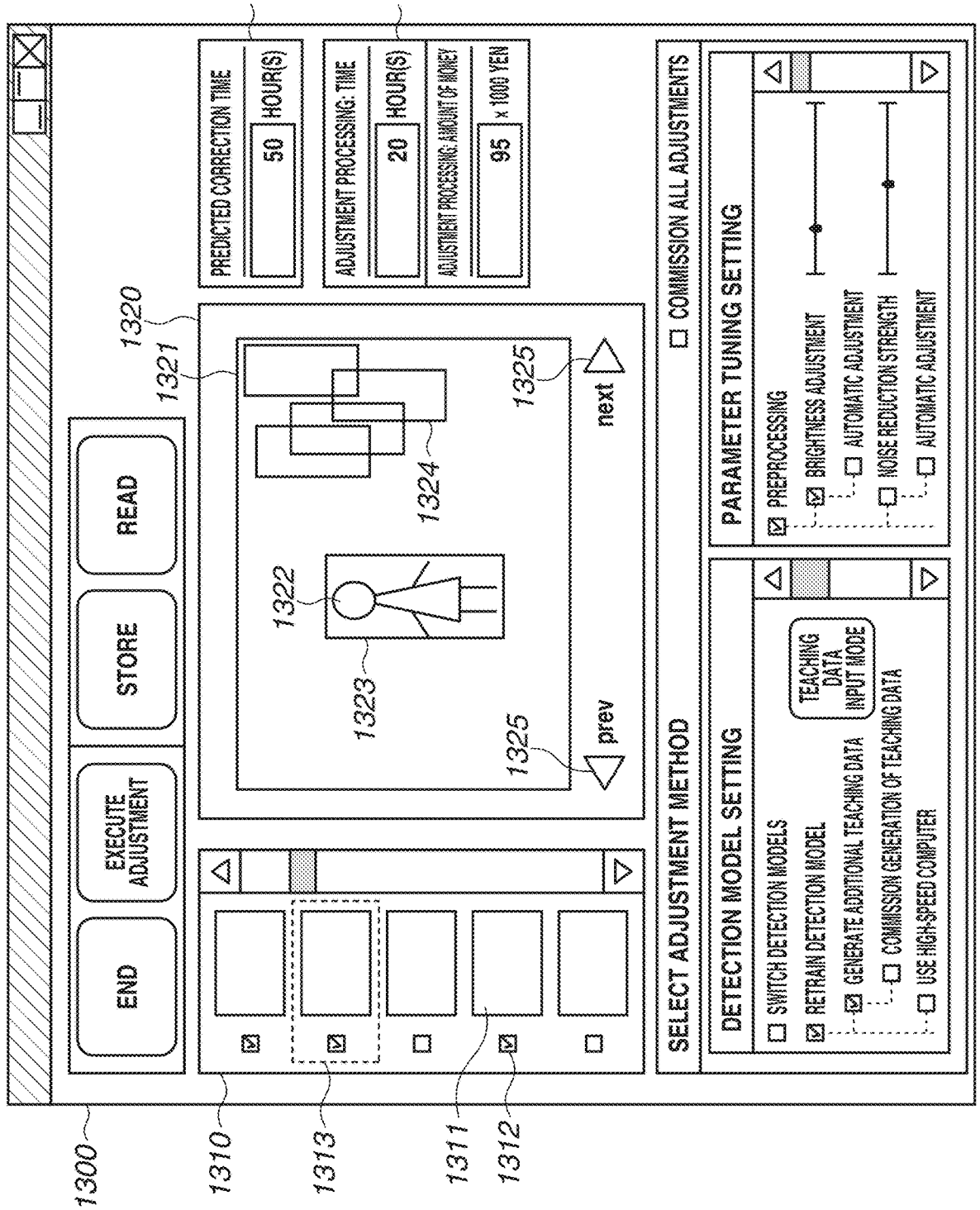
FIG. 13 is a diagram illustrating an example of an application screen for generating teaching data related to human body detection.

FIG. 13 illustrates a window 1300 of a GUI application according to the fourth exemplary embodiment. Since FIG. 13 is a modification of FIG. 5, a description of portions described in the first exemplary embodiment will be omitted, and only differences from the first exemplary embodiment will be described. Initially, the window 1300 includes an area 1310 for displaying the training image data set. In this area 1310, the images constituting the training image data set are listed in the form of thumbnails as represented by images 1311. Each image is associated with a checkbox 1312. A checked checkbox indicates that the image corresponding to the checkbox is a defective portion. As described above, in the defective portion determination according to the fourth exemplary embodiment, the defective portion setting unit 203 automatically determines images of which the detection results are insufficient. Based on the determination results, the checkboxes of the images determined to be defective portions are automatically checked. In addition, the user may be enabled to visually determine whether to set the respective images as defective portions, and check or uncheck the checkboxes to correct the settings of the defective portions.

The window 1300 also includes an area 1320 for displaying an image. The area 1320 displays an image selected from the images in the thumbnail list. In the example of FIG. 13, a dotted line 1313 in the area 1310 for displaying the thumbnail list indicates the image selected as the one to be displayed in the area 1320. The area 1320 displays an image 1321 corresponding to the thumbnail surrounded by the dotted line 1313. The image 1320 displayed here is a detection result image that is a captured image on which the result of the human body detection processing performed using the existing model is superimposed. The image 1321 includes a human body 1322. A detection result 1323 represented by a rectangular object surrounding the human body 1322 is superimposed on the image. In the example illustrated in FIG. 13, the image 1321 includes a large amount of erroneous detection occurring in the background portion, such as a detection result 1324. Specifically, rectangles representing detection results are superimposed on portions where there is no human body. The defective portion setting unit 203 thus determines this image to be a defective portion, and as a result, the checkbox in the portion surrounded by the dotted line 1313 is checked. Moreover, the user can select other images in the training data set from the thumbnail list displayed in the area 1310 to observe the detection results of the images. The user can also input operations for switching the image displayed in the area 1320 to the previous or subsequent one by operating buttons 1325.

As described above, the window 1300 displays images indicating the detection results of the human body detection processing and information about the defective portions among the detection results. Like the first exemplary embodiment, information about the correction cost is calculated from the information about the defective portions, and the correction cost is displayed in the correction cost display area 1330. Furthermore, the adjustment costs are calculated based on the set detection adjustment method, and the adjustment costs are displayed in the adjustment cost display area 1331. Based on such information, the user can examine whether to generate teaching data for human body detection training based on the obtained detection results or adjust the detection method and perform the detection processing on the training data set again.

Like the first exemplary embodiment, the processing for generating and outputting screen information illustrated in FIG. 13 is performed by the display control unit 207.

A first modification of the fourth exemplary embodiment will be described. The fourth exemplary embodiment has dealt with an exemplary embodiment where a captured moving image is divided into frame images for use. However, the target of the detection processing is not limited to an image and may be a moving image. The information processing apparatus 100 may determine a continuous range of frames as a defective portion.

As a second modification, the information processing apparatus 100 may set not only partial regions in an image but also images or continuous frame portions as defective portions. In other words, defective portions may be any portion that is a part of a detection target.

A third modification will be described. In the fourth exemplary embodiment, an exemplary embodiment for determining defective portions in units of images has been described by using the human body detection from images as an example. However, even in the human body detection from images, partial regions of images may be determined as defective portions as described in the first exemplary embodiment. For example, the information processing apparatus 100 may set a partial region where the number of detection results is locally large in the detection target image as a defective portion since there is likely to be occurred erroneous detection.

A fourth modification will be described. In the fourth exemplary embodiment, the information processing apparatus 100 is described to be also applicable to applications other than the inspection of concrete wall surfaces of an infrastructural structure by using the generation of teaching data for human body detection as an example. However, the applications of the information processing apparatus 100 are not limited thereto. As another example, the information processing apparatus 100 can also be applied to a case of generating teaching data for training a detection model that detects an anomaly for visual inspection in production facilities.

Fifth Exemplary Embodiment

Figure 12A:
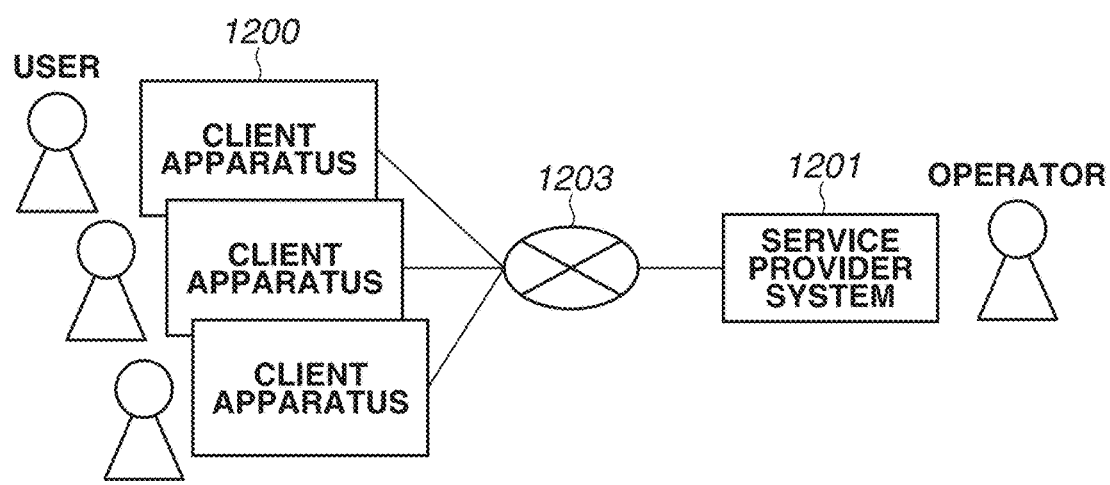
FIG. 12A is a diagram illustrating a configuration example of an information processing system.
Figure 12B:
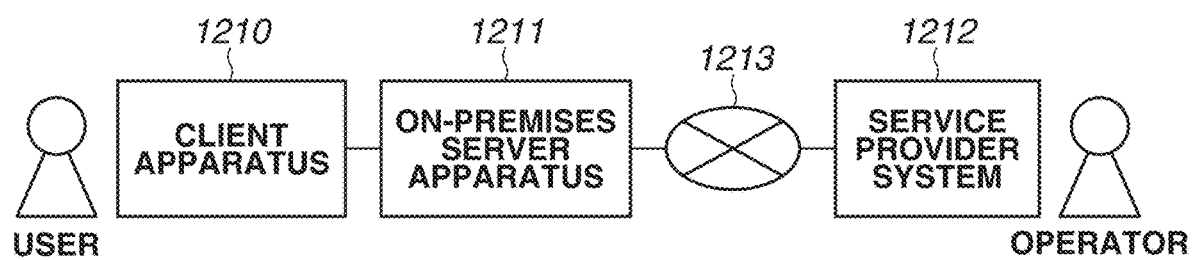
FIG. 12B is a diagram illustrating a configuration example of the information processing system.

FIGS. 12A and 12B are diagrams illustrating configuration examples of an information processing system according to a fifth exemplary embodiment. FIG. 12A is an explanatory diagram of a mode of an information processing system using SaaS. In FIG. 12A, client apparatuses 1200 operated by users are connected to a service provider system 1201 via the Internet 1203. In FIG. 12A, all the functions illustrated in FIG. 2 other than the display control unit 207 are implemented by the service provider system 1201. The client apparatuses 1200 accept information based on user operations, and transmit the information to the service provider system 1201. The client apparatuses 1200 also receive the display contents of the window 500 described with reference to FIG. 5 and the like from the service provider system 1201, and display the display contents and the like. In such a manner, the client apparatuses 1200 function as user interfaces.

With such a configuration, the client apparatuses 1200 can perform only less-demanding processing while processing with high computational complexity such as the detection processing is performed by the high-performance service provider system 1201. This enables the users to receive the service by only preparing low-price low-throughput client apparatuses.

In the SaaS configuration according to the present exemplary embodiment, a plurality of users uses the service provider system 1201. Specifically, in FIG. 12A, the users use the service provider system 1201 via the Internet 1203. In such a case, the adjustment costs may be calculated based on the operation status of the service.

Specifically, for example, if another user is training a new detection model and exclusively occupying the computing functions of the service provider system 1201, training is unable to be performed until the foregoing training is completed. If the training of a detection model is selected by the setting of the adjustment method, the training is then predicted to take longer than usual to be completed. The adjustment cost estimation unit 209 may thus predict the time of the adjustment processing by taking into account the operation status of the service provider system 1201, and output the result as an adjustment cost.

The adjustment cost estimation unit 209 may use not only the operation status of the service provider system 1201 but also other information as the operation status of the service to be used in calculating the adjustment costs. For example, if the option to commission the generation of teaching data is selected in adjusting the detection processing, an operator performs the work of generating teaching data. If another user is commissioning the generation of teaching data and the work of generating the teaching data is not completed, the operator is unable to accept the next commission to generate teaching data. If the commission to generate teaching data is selected by the setting of the adjustment method, the adjustment processing is then predicted to take longer than usual. The adjustment cost estimation unit 209 may thus predict the time of the adjustment processing by taking into account the work status of the operator, and output the result as an adjustment cost.

Moreover, the users' execution results may be accumulated in the service provider system 1201 and used in setting the initial values of the adjustment method. Specifically, the service provider system 1201 accumulates the settings of the adjustment methods executed by various users, and identifies frequently-used setting items or setting combinations. The client apparatuses 1200 then display such settings on the display unit as the initial values of the adjustment method.

The defective portion setting unit 203 may similarly determine parameters related to the setting of defective portions based on the users' execution results. For example, in the third method according to the first exemplary embodiment, defective regions are automatically set by calculating the degrees of similarity with the training images and setting regions where the degrees of similarity are at or below a predetermined level as defective portions. In such a case, a parameter refers to the threshold for determining whether "the degrees of similarity are at or below a predetermined level". If this threshold parameter is not appropriate, defective portions are not appropriately set and the user corrects the defective portions. An appropriate threshold for the degree of similarity can thus be calculated by accumulating threshold parameters in the cases where defective portions are not corrected as the users' execution results, and determining the mode or average thereof. After the parameter is thus appropriately calculated, defective portions can be set by using the parameter.

FIG. 12B is an explanatory diagram of another mode of the information processing system. As a processing configuration different from that of FIG. 12A, FIG. 12B illustrating a configuration including an on-premises server apparatus 1211. In FIG. 12B, the functions described with reference to FIG. 2 are implemented by cooperation of a client apparatus 1210, the on-premises server 1211, and a service provider system 1212. For example, the service provider system 1212 functions as the detection unit 202 of high computational complexity. The client apparatus 1210 functions as a user interface as in the example of FIG. 12A. The on-premises server apparatus 1211 functions as the configuration illustrated in FIG. 2 other than the detection unit 202.

Such processing distribution accelerates the response of cost calculations to user operations such as correction of defective portions, and reduces the user's stress in making operations. Moreover, if the detection target image or the learning model is confidential, such information may be stored in the on-premises server apparatus 1211 in the own company. In such a case, the on-premises server apparatus 1211 includes a configuration for storing information, such as the model storage unit 201.

As described above, according to the foregoing exemplary embodiments, a mechanism for obtaining an appropriate detection result while suppressing costs can be provided.

While the preferred exemplary embodiments of the present invention have been described in detail above, the present invention is not limited to such specific exemplary embodiments, and various changes and modifications can be made without departing from the gist of the present invention set forth in the claims.

Other Exemplary Embodiments

The present invention can also be implemented by processing for supplying a program for implementing one or more of the functions of the foregoing exemplary embodiments to a system or an apparatus via a network or a storage medium, and reading and executing the program by one or more processors of a computer in the system or apparatus. A circuit (for example, application specific integrated circuit (ASIC)) for implementing one or more functions can also be used for implementation.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a mechanism for obtaining an appropriate detection result while suppressing costs can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more memories storing instructions; and
one or more processors executing the instructions to:
  detect at least one deformation of a structure from an image to be processed by detection processing capable of adjusting at least one setting;
  set a defective portion of the detection processing;
  estimate, as a correction cost, a time or a fee needed to manually correct a result of detection of the defective portion by a user;
  estimate, as an adjustment cost, a time or a fee needed to perform a redetection processing depending on an adjustment of the setting of the detection processing, wherein the adjustment cost includes a cost needed to retrain a detection model; and
  control to display both the correction cost and the adjustment cost on a display unit in a comparable manner.

2. The information processing apparatus according to claim 1, wherein the correction cost refers to a cost needed in a case where the defective portion is reduced by making a correction without performing the detection processing again, and the adjustment cost refers to a cost needed in a case where the defective portion is reduced by performing the detection processing with the setting adjusted.

3. The information processing apparatus according to claim 1,
wherein the detection processing is processing using the detection model trained with a training image and teaching data, the training image being known to include the detection target, the teaching data indicating a position of the detection target in the image.

4. The information processing apparatus according to claim 3, wherein the one or more processors further execute the instructions to:
display a plurality of parameters to be set for the detection processing in a selectable manner, and
estimate the adjustment cost needed in a case where a parameter selected by a user among the displayed parameters is adjusted.

5. The information processing apparatus according to claim 4, wherein the parameters include a parameter of image processing to be performed on the image to be processed before or after the detection processing using the detection model.

6. The information processing apparatus according to claim 1, wherein the one or more processors further execute the instructions to:
display a result image obtained by superimposing the result of detection on the image to be processed, and
set a region specified by the user on the result image as the defective portion.

7. The information processing apparatus according to claim 1, wherein the defective portion is set based on a result of the detection processing.

8. The information processing apparatus according to claim 7,
wherein the detection processing is processing using the detection model trained with a training image and teaching data, the training image being known to include the deformation of the structure and the teaching data indicating a position of the deformation of the structure in the image, and
wherein the defective portion is set based on a degree of similarity between an image of the deformation of the structure and the training image.

9. The information processing apparatus according to claim 7,
wherein the deformation of the structure is a crack in a wall surface, and
wherein the defective portion is set based on a length of a result of detection of the crack.

10. The information processing apparatus according to claim 1, wherein the correction cost is estimated based on an area of the defective portion.

11. The information processing apparatus according to claim 1, wherein the correction cost is estimated based on an image feature amount of the defective portion.

12. The information processing apparatus according to claim 1, wherein the one or more processors further execute the instructions to:
detect, in a case where a re-execution instruction for the detection processing is accepted, the deformation of the structure by the detection processing with the setting adjusted,
combine a result of detection obtained by the detection processing with the unadjusted setting and a result of detection obtained by the detection processing related to the re-execution instruction, and
display the combined result of detection.

13. The information processing apparatus according to claim 4, wherein the one or more processors further execute the instructions to:
identify a recommended adjustment method based on the defective portion, and
display the identified adjustment method.

14. The information processing apparatus according to claim 13, wherein the one or more processors further execute the instructions to:
estimate an expected value of improvement of the result of detection by the detection processing using the recommended adjustment method, and
display the expected value.

15. An information processing method to be performed by an information processing apparatus, the method comprising:
detecting at least one deformation of a structure from an image to be processed by detection processing capable of adjusting at least one setting;
setting a defective portion of the detection processing;
estimating, as a correction cost, a time or a fee needed to manually correct a result of detection of the defective portion by a user;
estimating, as an adjustment cost, a time or a fee needed to perform a redetection processing depending on an adjustment of the setting of the detection processing, wherein the adjustment cost includes a cost needed to retrain a detection model; and
controlling to display both the correction cost and the adjustment cost on a display unit in a comparable manner.

16. A computer-readable storage medium storing a computer-readable program to be read and executed by an information processing apparatus and thereby cause the information processing apparatus to:
detect at least one deformation of a structure from an image to be processed by detection processing capable of adjusting at least one setting;
set a defective portion of the detection processing;
estimate, as a correction cost, a time or a fee needed to manually correct a result of detection of the defective portion by a user;
estimate, as an adjustment cost, a time or a fee needed to perform a redetection processing depending on an adjustment of the setting of the detection processing, wherein the adjustment cost includes a cost needed to retrain a detection model; and
control to display both the correction cost and the adjustment cost on a display unit in a comparable manner.

* * * * *